United States Patent [19]
Cooper et al.

[11] Patent Number: 6,091,567
[45] Date of Patent: Jul. 18, 2000

[54] MODELING POSITION ERROR NONLINEARITY TO IMPROVE SERVO PERFORMANCE

[75] Inventors: Evert Steen Cooper, Morgan Hill, Calif.; Randall David Hampshire, Agra, Okla.

[73] Assignee: Seagate Technology, Inc., Scotts Valley, Calif.

[21] Appl. No.: 09/052,896

[22] Filed: Mar. 31, 1998

Related U.S. Application Data

[60] Provisional application No. 60/071,158, Jan. 13, 1998.

[51] Int. Cl.$^7$ .................................................. G11B 5/596
[52] U.S. Cl. .......................... 360/77.08; 360/77.07; 360/78.09; 360/78.14
[58] Field of Search .................. 360/77.04, 77.07, 360/77.08, 78.04, 78.14, 78.09

[56] References Cited

U.S. PATENT DOCUMENTS

| | | | |
|---|---|---|---|
| 5,510,939 | 4/1996 | Lewis | 360/77.05 X |
| 5,576,909 | 11/1996 | Dierkes et al. | 360/77.04 X |
| 5,721,648 | 2/1998 | Phan et al. | 360/77.08 X |
| 5,781,365 | 7/1998 | Romano et al. | 360/78.06 |
| 5,875,066 | 2/1999 | Ottesen | 360/75 X |

*Primary Examiner*—Andrew L. Sniezek
*Attorney, Agent, or Firm*—Crowe & Dunlevy

[57] ABSTRACT

An apparatus and method are disclosed for improving servo performance of a disc drive. The disc drive includes a head adjacent a rotatable disc on which data are stored on a plurality of tracks. A servo circuit is provided to control the position of the head by generating an actual (raw) position error signal (PES) nominally characterized as nonlinear over a portion of the width of a selected track and indicative of position of the head relative to the selected track. The servo circuit further generates a predicted PES as an approximation of the actual PES, and then controls head position through summation of the actual PES with the predicted PES. The servo circuit includes a burst signal generator which generates predicted burst signals as approximations of actual burst signals determined from readback signals from the head as the head reads servo burst patterns on the disc. Substantial portions of the servo circuit operation are preferably carried out by a programmable processor device, such as a digital signal processor.

12 Claims, 13 Drawing Sheets

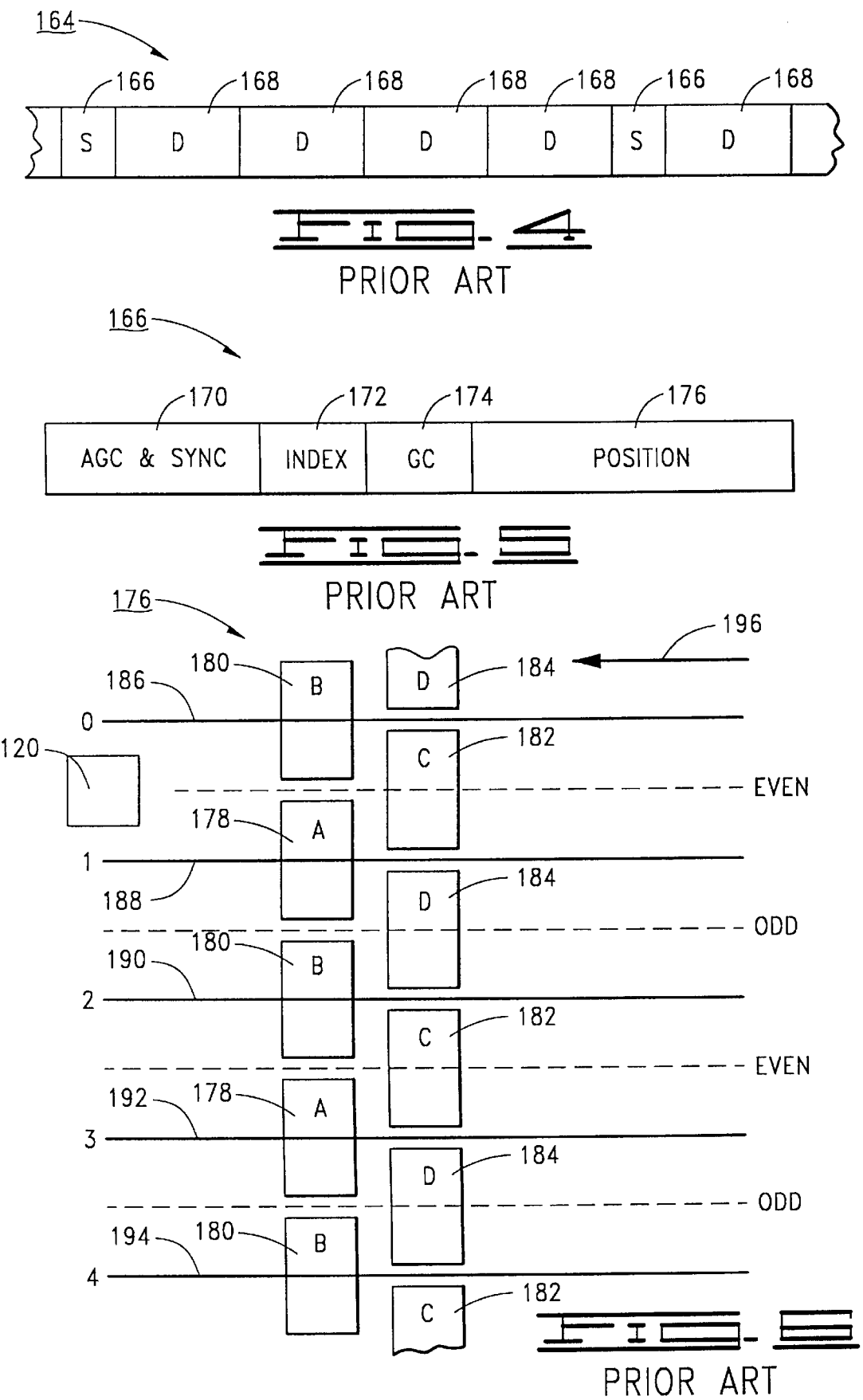

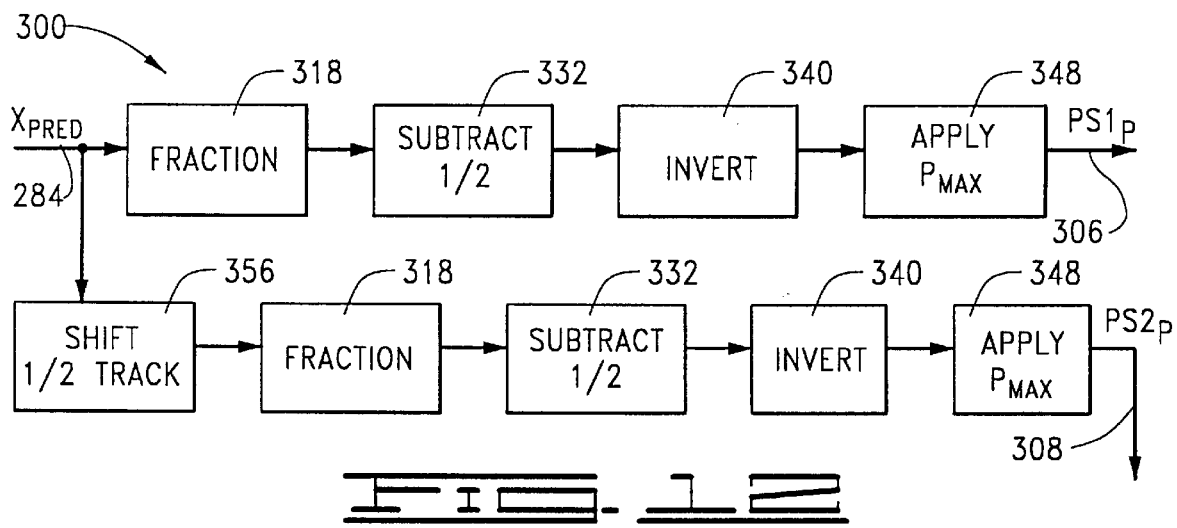
FIG. 12
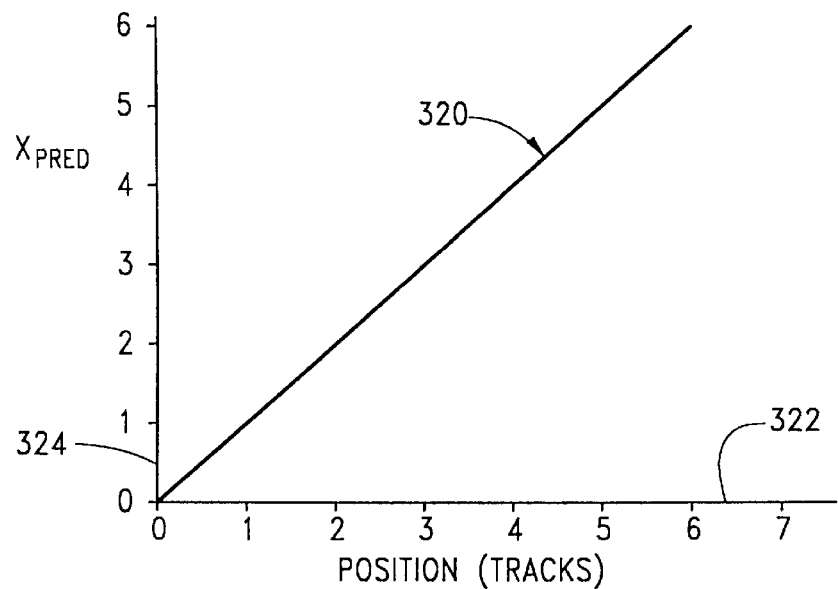
FIG. 13
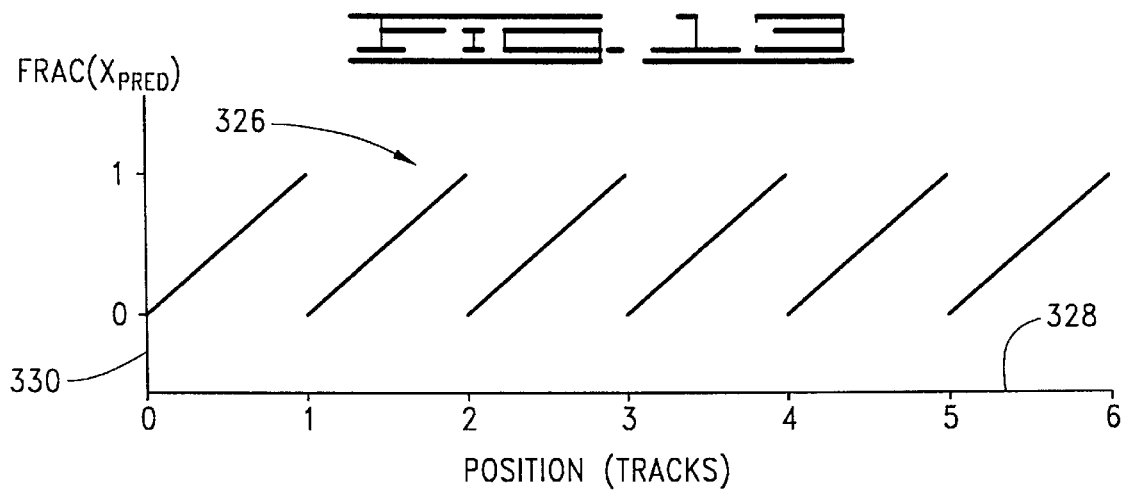
FIG. 14

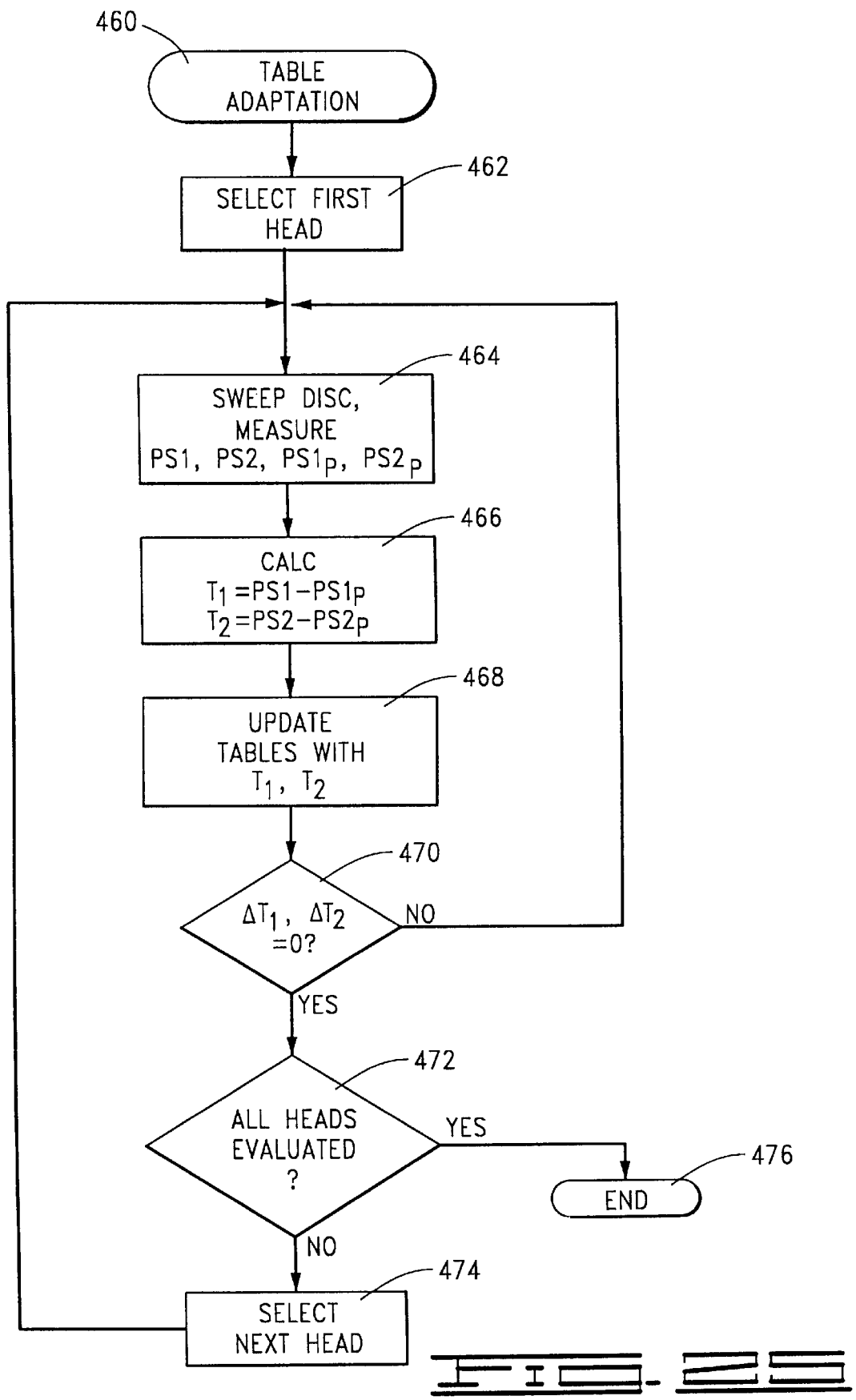

MODELING POSITION ERROR NONLINEARITY TO IMPROVE SERVO PERFORMANCE

RELATED APPLICATIONS

This application claims the benefit of U.S. Provisional Application Ser. No. 60/071,158 entitled ALGORITHM FOR ADAPTIVE PES NON-LINEARITY COMPENSATION, filed Jan. 13, 1998.

FIELD OF THE INVENTION

This invention relates generally to the field of disc drive data storage devices, and more particularly, but not by way of limitation, to improving servo performance of a disc drive through the use of an adaptive, nonlinear model of a head/disc assembly of the drive.

BACKGROUND

Disc drives are typically used as primary data storage devices in modern computer systems and networks, due to the efficient and cost-effective manner in which large amounts of computerized data can be stored and retrieved. Disc drives of the present generation have data storage capacities measured in excess of several gigabytes (GB) and can be used alone (as in a typical personal computer configuration) or in multi-drive data storage arrays (as with an internet network server or a mainframe computer).

A typical disc drive comprises a plurality of rigid magnetic storage discs which are axially aligned and arranged about a spindle motor for rotation at a constant high speed (such as around 10,000 revolutions per minute). An array of read/write heads are provided to transfer data between tracks of the discs and a host computer in which the disc drive is mounted. The heads are mounted to a rotary actuator assembly and are controllably positioned adjacent the tracks by a closed loop servo system.

The servo system primarily operates in one of two selectable modes: seeking and track following. A seek operation entails moving a selected head from an initial track to a destination track on the associated disc surface through the initial acceleration and subsequent deceleration of the head away from the initial track and toward the destination track. A velocity control approach is used whereby the velocity of the head is repeatedly measured and compared to a velocity profile defining a desired velocity trajectory for the seek. Once the head has settled on the destination track, the servo system enters a track following mode of operation wherein the head is caused to follow the destination track until the next seek operation is performed.

Both track seeking and track following operations typically require generation of a position error signal (PES) which gives an indication of the radial position of the head with respect to the tracks on the disc. In high performance disc drives, the PES is derived from either a prerecorded servo disc with a corresponding servo head (a dedicated servo system), or from servo information that is embedded on each recording surface among user data blocks at predetermined intervals (an embedded servo system).

The head provides the servo information to the servo system which generates the PES with a magnitude that is typically equal to zero when the head is positioned over the center of the track ("on track"), and is nominally linearly proportional to a relative misposition distance ("off track") between the head and the center of the track, with a polarity indicative of radial off track direction. To provide stable operation, the transfer function relating PES to actual radial misposition should be constant and independent of distance off track in the presence of variations in head signal amplitude, linear recording bit density, head to media spacing and head skew angle.

Recently, magneto-resistive (MR) heads have supplanted prior use of thin film heads due to the superior magnetic recording properties associated with MR heads. Generally, an MR head includes a magneto-resistive read element characterized as having a baseline direct current (DC) electrical resistance that changes when subjected to magnetic fields of selected orientation. An MR head can detect previously recorded data in response to variations in voltage measured across the MR head when a read bias current of predetermined magnitude is passed through the MR element. MR heads have allowed disc drives of the present generation to achieve track densities greater than about 4,000 tracks per centimeter (about 10,000 tracks per inch).

Although MR heads facilitate ever greater levels of magnetic recording densities, there are nevertheless disadvantages associated with such heads when used as position transducers, due to nonlinear readback response with respect to position. This nonlinearity is due to a variety of factors, including MR element bias, sensitivity differences across pole face geometry of the MR elements, and aggravation of the inherent nonlinearity of end fringing fields, as the width of a typical MR element readback gap is typically appreciably less than the width of the tracks on the associated disc.

Historically, PES nonlinearity primarily affected track seeking performance, producing track arrival over-shoot or under-shoot which prolonged arrival settling time. PES nonlinearity did not so adversely affect track following performance (i.e., did not induce significant track misregistration, or TMR), because the track center for reading and writing, defined by servo bursts of the servo information (typically referred to as A, B, C and D bursts) nominally coincided with a null response of positioning burst signals A−B=0.

With MR heads, however, PES nonlinearity also affects TMR control during track following because the MR element is physically separated from the write element of the head by a distance governed by the design of the head; thus, inaccuracies can arise as a result of head skew (with respect to the disc) and head fabrication tolerances. Because the write gap and the read gap are at slightly different radial positions, the PES must be operated at a position A≠B to properly center the write gap over the track. Further, non-uniformity in readback magnetic field sensitivity generally produces a positional shift in null response of bursts A−B=0. Unless properly characterized and compensated, the nonlinearity will produce a discrepancy from desired positioning and can introduce instabilities into the servo system.

PES nonlinearity due to the use of MR heads can not only therefore adversely affect seek performance, but track following performance as well. Such effects can further serve as a limit on achievable track densities (and hence data storage capacities), due to the TMR budget necessary to minimize interference with (such as overwriting of) adjacent tracks.

Accordingly, there remains a continual need in the art for improvements whereby disc drive performance can be optimized through minimizing the effects of position error signal nonlinearities.

SUMMARY OF THE INVENTION

The present invention provides an apparatus and method for improving disc drive servo control performance.

In accordance with preferred embodiments, the disc drive is provided with a head which is controllably positionable adjacent a rotatable disc on which a plurality of tracks are defined. A servo circuit controls the position of the head adjacent the tracks by generating an actual (raw) position error signal (PES) generally indicative of the position of the head relative to a selected track. As a result of various effects, including magneto-resistive (MR) head asymmetry, the PES will be nominally characterized as nonlinear over a portion of the width of the selected track. A predicted PES is next generated as an approximation of the actual PES and includes the nonlinear characteristics of the actual PES. The servo circuit controls head position in relation to a difference between the actual PES with the predicted PES.

Preferably, the servo circuit comprises a demodulator which generates burst signals in response to readback signals from the head as the head reads servo burst patterns associated with the selected track. An actual PES generator outputs the actual PES as a selected combination of the burst signals and a summing block sums the actual PES with the predicted PES to generate a PES error. An estimation and prediction circuit generates the estimated position of the head in response to the PES error from the summing block.

Significantly, the servo circuit is further provided with a burst signal predictor which generates predicted burst signals as approximations of the burst signals generated by the demodulator, and a predicted PES generator which generates the predicted position error signal in response to the predicted burst signals, the predicted PES generator nominally identical to the actual PES generator. Particularly, the burst signal predictor models the actual burst signals from the demodulator as substantially triangular waveforms to which saturation thresholds are applied, the saturation thresholds generally correlated to head width and determined in an adaptive manner. Saturation zones defined by the saturation thresholds can be curvilinearly shaped to provide improved predictions of the burst signals from the demodulator.

Additionally, a table is preferably provided to further improve the estimates of the burst signals by accounting for asymmetric, higher order effects not accounted for by the burst signal predictor. The table stores a set of error values in relation to a difference between the burst signals from the demodulator and the predicted burst signals generated by the burst signal generator. Substantial portions of these servo circuit operations are preferably carried out by a programmable processor device, such as a digital signal processor.

Unlike prior art disc drives which have typically attempted to compensate for nonlinear response characteristics of magneto-resistive (MR) heads through the use of a PES linearization operation, preferred embodiments of the present invention as disclosed herein operate instead to formulate a very accurate, nonlinear model of the nonlinearities of the actual system. Thus, deficiencies associated with PES linearization do not serve as an upper limit on achievable servo performance and track density levels, as there is no necessity to linearize the PES.

Another important advantage is the potentially wider range of head width variations that can be accommodated using the present invention as embodied herein. A significant economic benefit can inure due to reduced manufacturing costs through the relaxation of head width tolerances, improvements in manufacturing yields and reductions in manufacturing costs.

Finally, because the saturation thresholds used by the burst signal predictor are directly correlated to head width, the present invention can be further utilized to provide feedback to a supplier of the heads, resulting in improved head manufacturing process control. As will be recognized, it is generally difficult for a disc drive manufacturer to assess variations in effective read element head width for a population of heads without the utilization of time and resource intensive efforts.

These and various other features as well as advantages which characterize the present invention will be apparent from a reading of the following detailed description and a review of the associated drawings.

BRIEF DESCRIPTION OF THE DRAWINGS

FIG. 4 is a representation of a portion of a selected track on the disc of FIG. 1, illustrating the layout of servo blocks and data blocks.

FIG. 5 shows one of the servo blocks of FIG. 4 in greater detail.

FIG. 6 illustrates the position field of the servo block of FIG. 4 for a plurality of adjacently disposed tracks.

FIG. 12 is a control diagram representation of the operation of the position signal (PS) predictor of FIG. 11, which generates a $PS1_P$ signal and a $PS2_P$ signal, respectively, as predictions of the PS1 and PS2 signals of FIG. 8.

FIG. 13 is a graphical representation of predicted position $X_{PRED}$, as generated by the predictor observer block of FIG. 11, versus position, measured in tracks of the associated disc.

FIG. 14 shows the operation of the fraction block of FIG. 12 to generate a series of fraction segments from the curve of FIG. 13.

FIG. 25 is a flow chart illustrating the steps of a TABLE ADAPTATION routine, representative of the programming of the DSP of FIG. 3 in setting appropriate values for the PS1 and PS2 tables of FIG. 3, to address the MR head asymmetries set forth by FIG. 24.

DETAILED DESCRIPTION

In order to set forth various aspects of the present invention, it will be helpful to first briefly describe the construction and operation of a disc drive constructed in accordance with preferred embodiments of the present invention.

Figure 1:
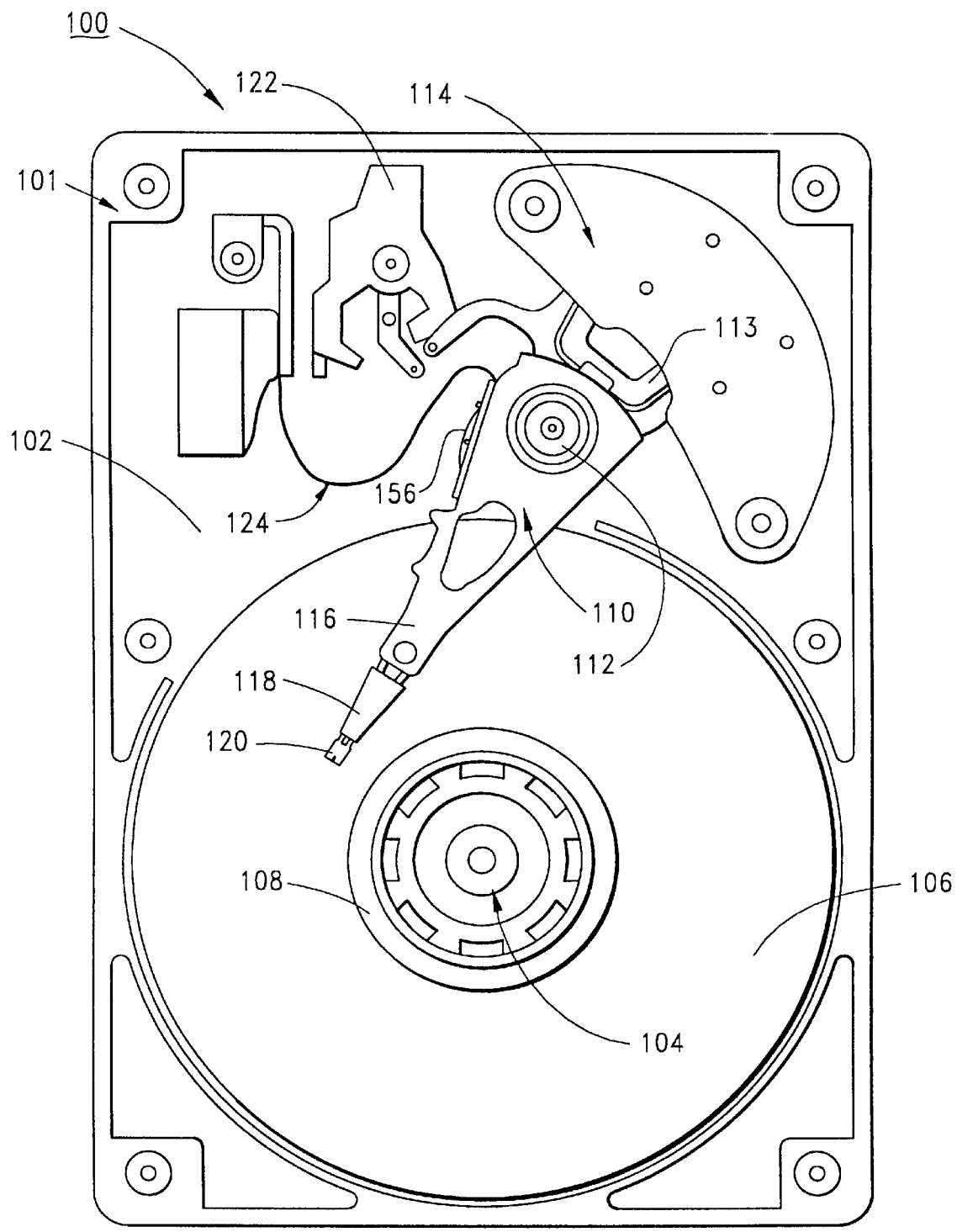
FIG. 1 is a top plan view of a disc drive constructed in accordance with preferred embodiments of the present invention.

With reference to FIG. 1, shown therein is a top plan view of a disc drive 100, which includes a head-disc assembly (HDA) 101 and a disc drive printed wiring assembly (PWA) which is mounted to the underside of the HDA 101 and thus, not visible in FIG. 1. The PWA provides circuitry necessary to control the operation of the HDA 101 and to transfer data between the HDA 101 and a host computer in which the disc drive 100 can be mounted in a user environment.

The HDA 101 includes a base deck 102 to which various disc drive components are mounted. A top cover, which has been omitted from FIG. 1 to expose interior components of interest, cooperates with the base deck 102 to form an internal environment for the disc drive 100 with controlled air pressure, humidity and cleanliness levels. A spindle motor 104 is provided to rotate a stack of discs 106 at a constant high speed, with a disc clamp 108 securing the discs 106 to the spindle motor 104.

To access the discs 106, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms 116 from which corresponding flexure assemblies 118 extend. Heads 120 are provided at distal ends of the flexure assemblies 118 and are supported over the discs 106 by air bearings established by air currents set up by the rotation of the discs 106. The heads 120 are preferably characterized as magneto-resistive (MR) heads.

A latch assembly 122 is provided to secure the heads over landing zones (not designated) at the innermost diameters of the discs 106 when the disc drive 100 is deactivated. A flex circuit assembly 124 provides electrical communication paths between the actuator assembly 110 and the disc drive PWA (mounted to the underside of the disc drive 100 as mentioned above).

Figure 2:
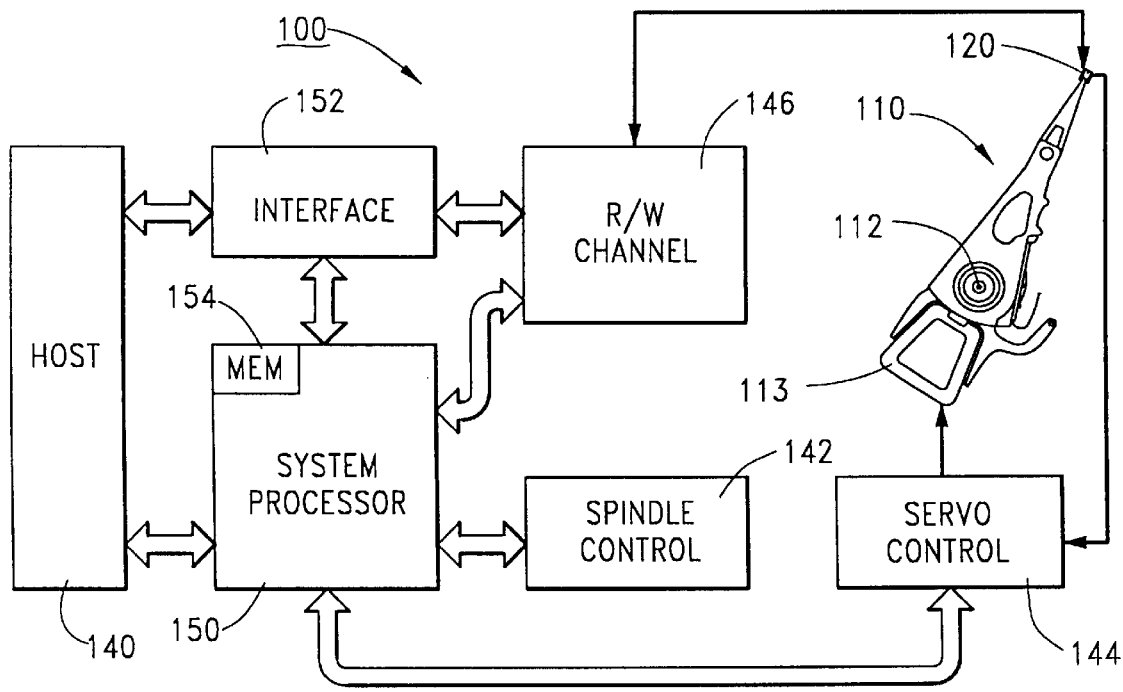
FIG. 2 is a functional block diagram of the disc drive of FIG. 1.

FIG. 2 provides a functional block diagram of the disc drive 100 of FIG. 1, operably connected to a host computer 140. As shown in FIG. 2, the circuitry used to control the HDA 101 includes a spindle control circuit 142, a servo control circuit 144 and a read/write channel 146, all operably connected to a system processor 150. It will be recognized that the system processor 150 communicates with and controls the operation of these circuits in a known manner, with the exceptions as discussed below. Additionally, an interface circuit 152 is shown connected to the read/write channel 146 and to the system processor 150, with the interface circuit 152 serving as a data interface and buffer for the disc drive. The interface circuit 152 includes a sequencer (not separately shown) which comprises hardware used to establish varying timing sequences during the operation of the read/write channel 146.

The spindle control circuit 142 controls the rotational speed of the spindle motor 104 (FIG. 1). The servo control circuit 144 (also referred to herein as "servo circuit") controls the position of the heads 120 with respect to the discs 106 by applying current to the actuator coil 113 in response to servo information read by the heads 120. The read/write channel 146 operates to write data to the discs 106 in response to user data provided to the channel from the interface circuit 152 by encoding and serializing the data and generating a write current utilized by the head 120 to magnetize portions of a selected track on the disc 106.

Correspondingly, previously stored data are retrieved by the read/write channel 146 by decoding the data from the read signals generated by the head 120 as the head passes over the selected track on the disc 106. Various operations of the disc drive 100 are controlled by the system processor 150, in accordance with programming stored in memory (MEM) 154, which preferably comprises both volatile memory devices such as dynamic random access memory (DRAM) as well as non-volatile memory devices such as flash memory.

Figure 3:
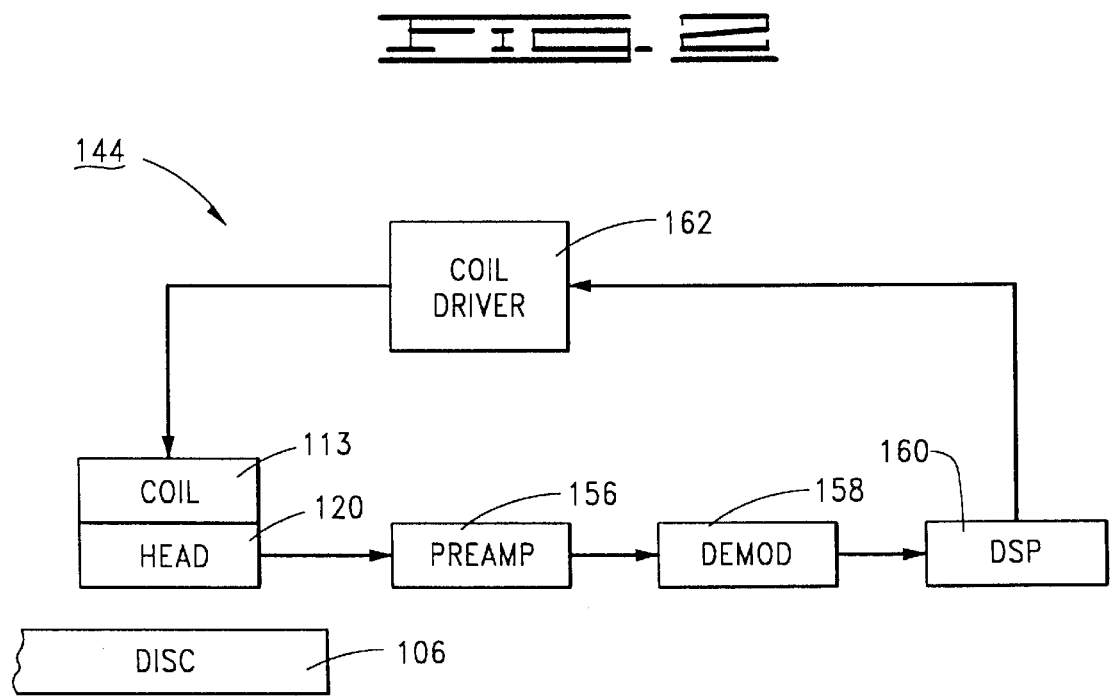
FIG. 3 is a functional block diagram of the servo circuit of FIG. 2.

Referring now to FIG. 3, shown therein is a functional block diagram of the servo circuit 144 of FIG. 2. As set forth by FIG. 3, servo information is read by the selected head 120 and amplified by a preamplifier circuit 156 ("preamp"). The preamp 156 is preferably disposed in the HDA 101 and mounted to the actuator assembly 110, as shown in FIG. 1. The amplified readback signals are presented to a demodulator circuit 158 ("demodulator," or "demod") which conditions the signals (including analog-to-digital conversion) and provides the same to a digital signal processor (DSP) 160.

The operation of the DSP 160 in accordance with preferred embodiments of the present invention will be discussed in greater detail below; generally, however, the DSP 160 generates a position error signal (PES) indicative of the position of the head 120 with respect to the disc 106 from the signals from the demodulator 158. In response to the resulting PES, as well as control inputs provided to the DSP 160 by the system processor 150 (FIG. 2), the DSP 160 outputs a correction signal to a coil driver 162 which in turn applies current to the coil 113 to adjust the position of the head 120.

The manner in which servo information is preferably arranged on the discs 106 is set forth by FIG. 4, which shows a portion of a selected track 164. The track 164 includes a plurality of servo blocks (S) 166 periodically dispersed among data blocks (D) 168, with the servo blocks storing servo information used by the servo circuit 144 (FIG. 3) and the data blocks (also referred to as "sectors") storing user data accessed by the read/write channel 146 (FIG. 3). As known in the art, the servo blocks 166 are written during disc drive manufacturing and angularly aligned so as to form a plurality of radially extending wedges on each of the recording surfaces of the discs, similar to spokes of a wheel. The data blocks 168 are subsequently defined during a disc drive formatting operation.

FIG. 5 shows a generalized representation of a selected one of the servo blocks 166 of FIG. 4 in greater detail. As shown in FIG. 4, each of the servo blocks 166 includes an automatic gain control (AGC) and synchronization (sync) field 170 used to optimize performance of the servo circuit 144 (FIG. 3), an index field 172 indicative of angular position, a Gray code (GC) field 174 indicative of radial position (track address) and a position field 176 which enables the servo circuit 144 to discern position of the head 120 with respect to the servo block 166, and hence the selected track 164.

FIG. 6 illustrates the position fields 176 of the servo blocks 166 of FIGS. 4 and 5 for a plurality of adjacently disposed tracks (such as 164). More particularly, the position fields 176 comprise a plurality of burst patterns 178, 180, 182 and 184 denoted respectively as A, B, C and D burst patterns. For reference, the arrangement of the A, B, C and D burst patterns 178, 180, 182 and 184 is referred to as a null quadrature pattern; however, at this point it will be recognized that the arrangement shown in FIG. 6 is for purposes of disclosure and that the present invention as claimed below is not necessarily limited thereto.

Adjacent C and D burst patterns 182, 184 define a plurality of track boundaries 186, 188, 190, 192, 194 (additionally identified in FIG. 6 as boundaries 0–4), so that each of the C and D burst patterns 182 and 184 has a width (measured along disc radius) substantially that of a corresponding track. For reference, tracks with C burst patterns 182 are denoted as "even" tracks and tracks with D burst patterns 184 are denoted as "odd" tracks.

The A and B burst patterns 178, 180 are offset by one-half track width with respect to the C and D burst patterns 182, 184, so as to define track centers for each of the tracks which are denoted by dotted lines halfway between adjacent track boundaries. Also shown in FIG. 6 is a selected head 120, which reads the associated A, B, C and D burst patterns 178, 180, 182, 184 as the disc rotates relative to the head 120 in a direction generally indicated by arrow 196.

Figure 7:
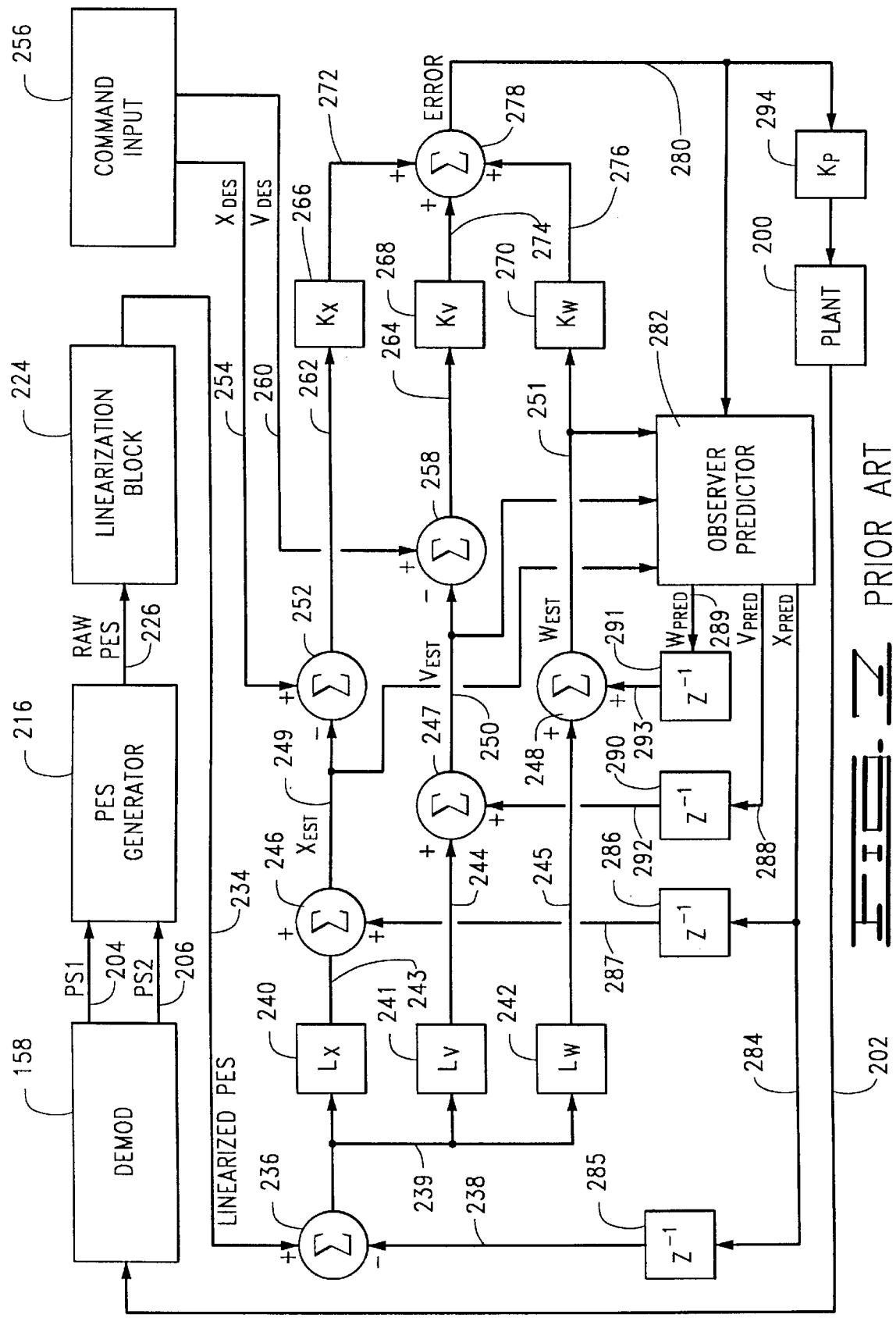
FIG. 7 is a control diagram representation showing the operation of a prior art servo system in controlling the position of a head with respect to a corresponding disc.

Referring now to FIG. 7, shown therein is a control diagram representation of a prior art servo system. The diagram of FIG. 7 is primarily representative of programming utilized by a programmable processing device, such as a DSP or similar controller, and has been provided in order to set forth a better understanding of the construction and operation of preferred embodiments of the present invention to be presented below. Accordingly, reference numerals used to identify various components in FIG. 7 will correspond to the same or similar components presented elsewhere in the drawings.

As shown in FIG. 7, a plant 200 is provided generally comprising a head, a disc, an actuator assembly and a VCM (such components previously shown in FIG. 1). The plant 200 outputs a servo information readback signal on path 202 from position fields (such as 176 of FIGS. 5 and 6) to a demodulator (denoted as 158, as in FIG. 3), which in response thereto outputs burst signals PS1 and PS2 on paths 204, 206 respectively. As the servo system of FIG. 7 is a digital system, it will be readily understood that the PS1 and PS2 signals, as well as signals derived therefrom, each comprise a sequence of samples at a sampling frequency corresponding to the rate at which the servo blocks 166 are presented to the servo system.

Generally, the PS1 and PS2 burst signals are obtained as the head of the plant 200 passes over adjacently disposed A and B burst patterns 178, 180 and C and D burst patterns 182, 184, respectively, as previously shown in FIG. 6. More particularly, the A and B burst patterns 178 are written using a sinusoidal write pattern of selected frequency and amplitude, with the B burst patterns 180 written at 180 degrees out of phase with respect to the A burst patterns 178; the C and D burst patterns 182, 184 are written in similar fashion. Thus, the PS1 signal, indicative of the sum of the measured amplitudes of the adjacent A and B burst patterns 178, 180, will have a zero value when the read element of the head 120 is disposed over the center of the track, a maximum positive value when over the center of an A burst pattern 178 (as with track boundaries 1 and 3 of FIG. 6) and a maximum negative value when over the center of a B burst pattern 180 (as with track boundaries 2 and 4 of FIG. 6).

Figure 8:
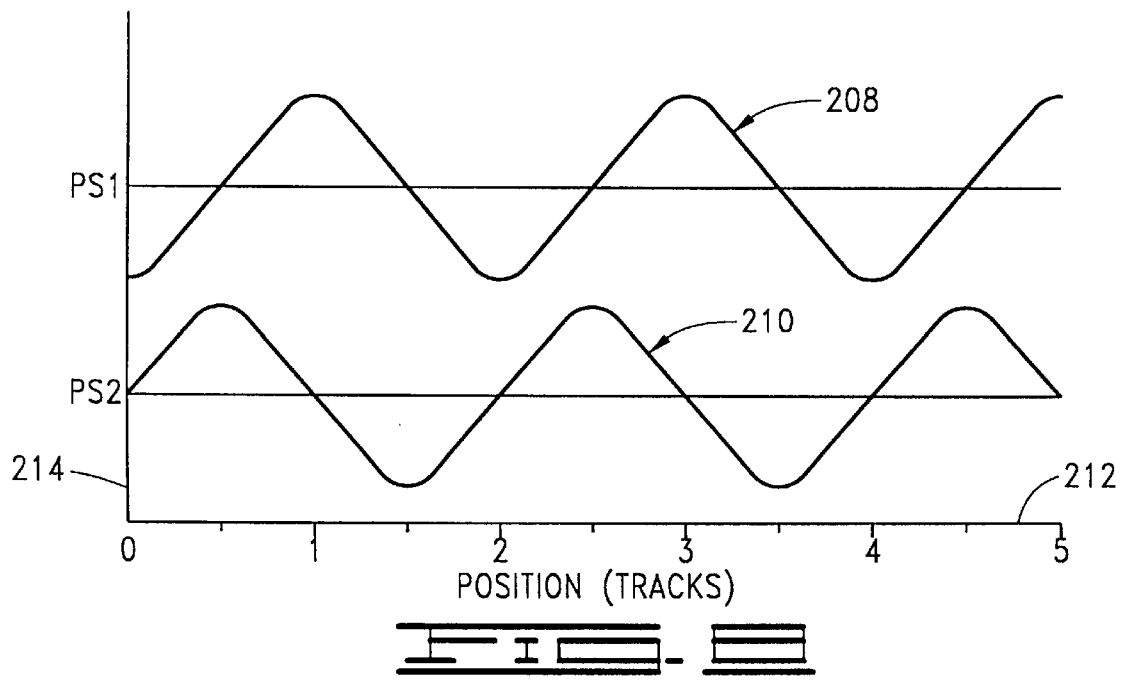
FIG. 8 is a graphical representation of position signals PS1 and PS2, generated in response to the position fields of FIG. 6.

The PS2 signal, indicative of the sum of the measured amplitudes of the adjacent C and D burst patterns 182, 184, will be similar to the PS1 signal except offset from the PS1 signal by one-half track. That is, the nulls will occur over track boundaries and positive and negative maximums will occur over track centers. For reference, typical PS1 and PS2 signals are shown in FIG. 8 at 208 and 210, with the signals plotted against an x-axis 212 indicative of radial position (tracks) and a y-axis 214 indicative of relative amplitude. The PS1 and PS2 burst signals are also sometimes referred to hereinbelow as "position signals."

Continuing with FIG. 7, the PS1 and PS2 signals are provided to a position error signal (PES) generator 216, which generates a raw PES signal in accordance with the following relationship:

$$\text{raw PES} = \frac{PS1}{|PS1| + |PS2|} \cdot \text{sign}\,[PS2] \quad (1)$$

so that the raw PES signal is equal to the magnitude of PS1 divided by the sum of the absolute value of PS1 and the absolute value of PS2, with a polarity (sign) that of PS2. Although the PES generator 216 generates the raw PES in accordance with equation (1), it will be recognized that other methodologies are well known and that the present invention is not so limited.

Figure 9:
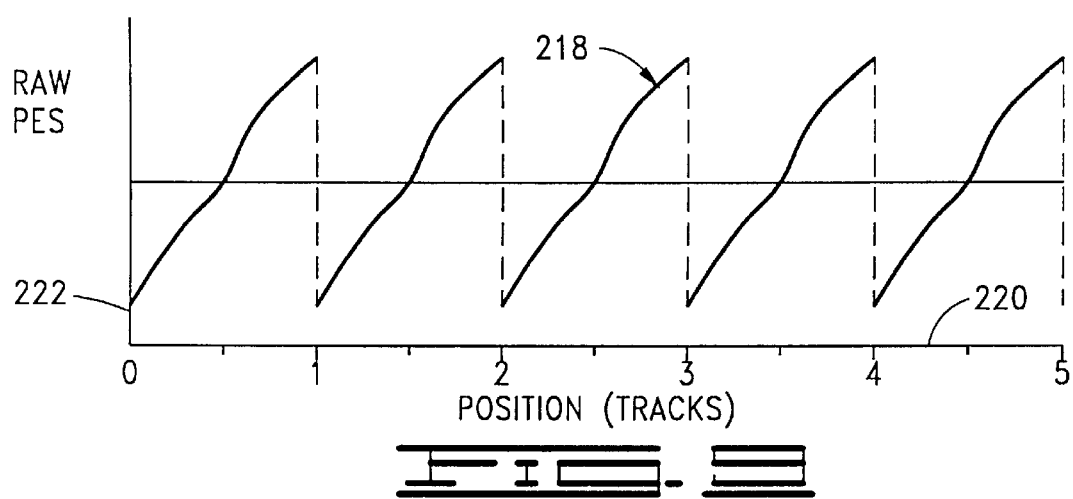
FIG. 9 is a representation of a raw position error signal (PES) generated in response to the PS1 and PS2 signals of FIG. 8, the raw position error signal characterized as comprising nonlinearities.

As discussed above, a PES should be linear with respect to track width so as to provide stable response and accurate control by the servo system. However, various factors relating to the construction and operation of MR heads will typically cause the raw PES to have a nonlinear response, such as set forth by raw PES curve 218 of FIG. 9, plotted against an x-axis 220 indicative of position (tracks) and a y-axis 222 indicative of magnitude.

Figure 10:
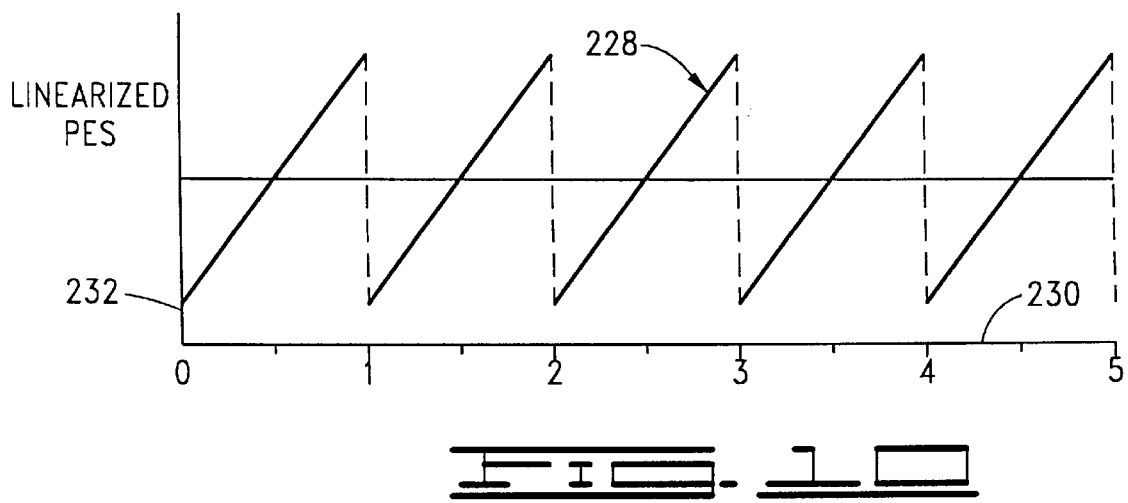
FIG. 10 is a representation of a linearized PES, showing an ideal, desired response.

Accordingly, it is common in the prior art to incorporate a PES linearization block, such as shown at 224, which receives the raw PES from the PES generator 216 by way of path 226 and modifies the same to generate a linearized PES, such as shown by curve 228 in FIG. 10. The linearized PES curve 228 of FIG. 10 is plotted against an x-axis 230 indicative of position (tracks) and a y-axis 232 indicative of amplitude. The operation of the linearization block 224 of FIG. 7 can be performed in accordance with any of a number of methodologies, such as set forth by copending U.S. patent application Ser. No. 08/704,897 filed Aug. 30, 1996 by Hampshire et al., assigned to the assignee of the present invention.

The linearized PES is output on path 234 and compared at a summing block 236 with a predicted position value $X_{PRED}$ on path 238, which is generated in a manner discussed below. The output of block 236 is the PES prediction error, which is provided (via path 239) to each of a series of gain blocks 240, 241 and 242, identified as $L_X$, $L_V$ and $L_W$, respectively. The outputs of the gain blocks 240, 241 and 242 are provided on paths 243, 244 and 245 to summing blocks 246, 247 and 248, which provide estimates of head position ($X_{EST}$), velocity ($V_{EST}$) and bias ($B_{EST}$) on paths 249, 250 and 251 as shown.

The estimated position $X_{EST}$ is summed at summing block 252 with a desired position $X_{DES}$ indicative of a desired position of the head provided on path 254 from a command input block 256. As will be appreciated, during track following the head will nominally be positioned over track center; however, it is sometimes found advantageous to position the head away from track center by a selected amount (usually measured in terms of percentage of track width, such as ±10% off track) to account for head skew, or during error recovery operations. Hence, the desired position $X_{DES}$ will normally be zero during track following.

In similar fashion, the estimated velocity $V_{EST}$ is summed at summing block 258 with a desired velocity $V_{DES}$ indicative of a desired velocity of the head. The desired velocity $V_{DES}$ is likewise provided by the command input block 256 along path 260, and is typically utilized during a seek operation wherein a velocity control approach is used to control the velocity trajectory of the head as it moves from the initial track to the destination track. Hence, during normal track following operations the desired velocity $V_{DES}$ will also be zero.

Output signals from the summing blocks 252, 258 are provided along paths 262, 264 to gain blocks 266 and 268 having gains of $K_X$ and $K_V$ as shown. As no bias adjustment is contemplated by the servo system of FIG. 7, the estimated bias $W_{EST}$ is applied directly to a corresponding gain block 270 having gain $K_W$. Output signals from the gain blocks 266, 268, 270 are provided on paths 272, 274, 276 and summed at a summing block 278 to provide an error signal on path 280. The error signal is provided to an observer/predictor block 282 ("observer"), which further receives the estimated position, velocity and bias $X_{EST}$, $V_{EST}$ and $W_{EST}$ from paths 249, 250 and 251. In response thereto, the observer 282 outputs the aforementioned predicted position $X_{PRED}$ on path 284, which is delayed one sample by delay block 285 and thereafter provided on path 238 to the summing block 236.

The predicted position $X_{PRED}$ is further provided to a second delay block 286 so that a delayed predicted position $X_{PRED}$ (path 287) is summed by the summing block 246 to generate the estimated position $X_{EST}$. The observer 282 also outputs predicted velocity and bias force ($V_{PRED}$ and $W_{PRED}$) values on paths 288 and 289. The $V_{PRED}$ and $W_{PRED}$ values are delayed by delay blocks 290 and 291 so that delayed $V_{PRED}$ and $W_{PRED}$ values (paths 292 and 293) are summed with the summing blocks 247 and 248 to generate the estimated velocity $V_{EST}$ and the estimated bias estimate $W_{EST}$.

Finally, the error signal from path 280 is further provided to a gain block 294 having gain $K_P$, the gain block 294 compensating for differences in response between the observer 282 and the plant 200. That is, $K_P$ is continually adjusted during operation as required to maintain the response characteristics of the observer 282 nominally the same as the plant 200.

The prior art servo system of FIG. 7 is susceptible to various effects, including nonrepeatable runout (NRRO) error, repeatable runout (RRO) error, measurement noise, and MR head effects and process variations which cannot be adequately modeled and thus removed by the operation of the linearization block 224. It follows that the use of the prior art servo system of FIG. 7 limits the achievable level of performance of a given system and further imposes limits on design criteria (maximum sampling rate, track density, etc.).

Figure 11:
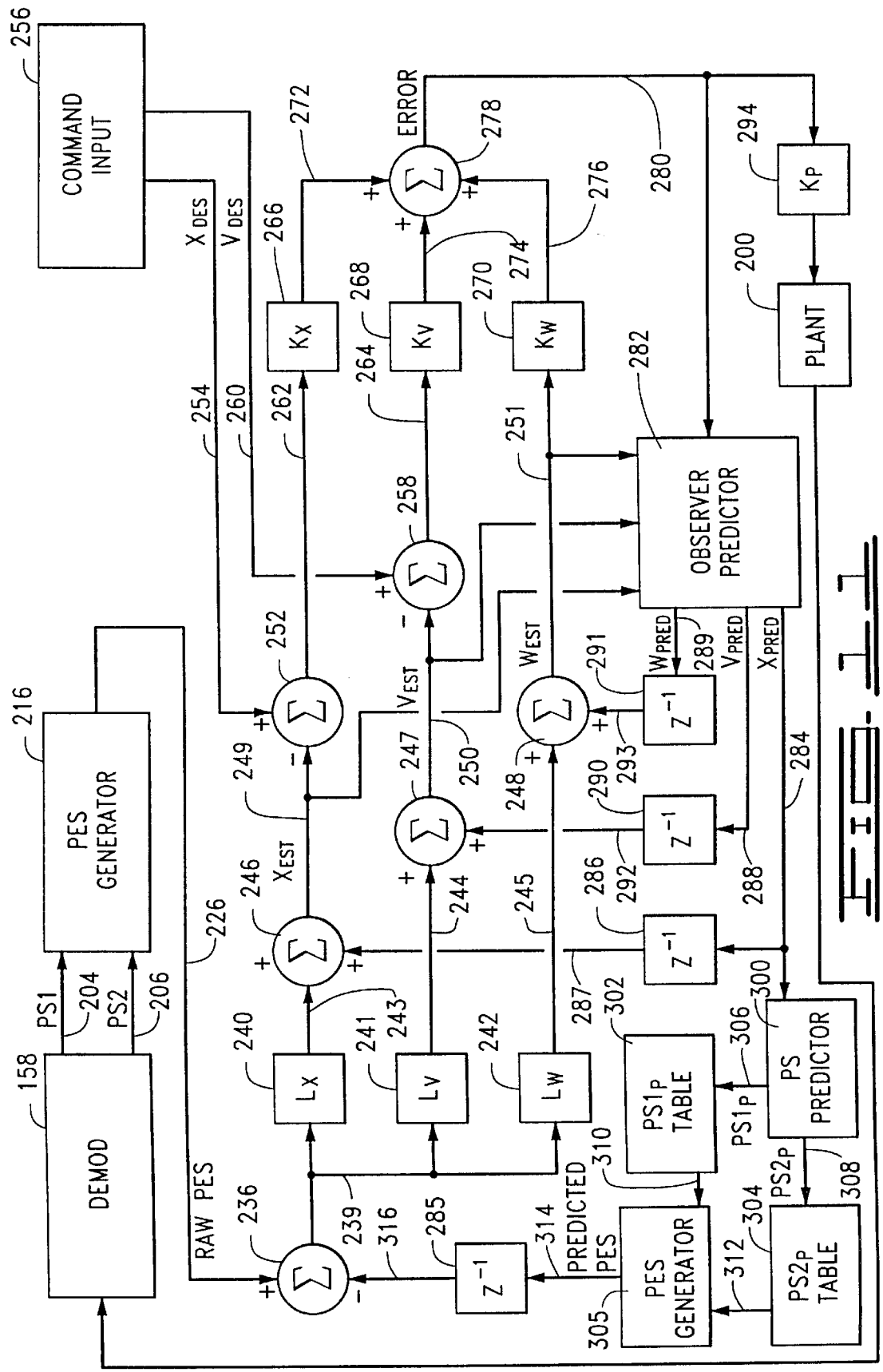
FIG. 11 is a control diagram representation showing the operation of the servo system of FIG. 3 in accordance with preferred embodiments of the present invention. The control diagram is representative of the programmed operation of the digital signal processor (DSP) of FIG. 3.

Accordingly, FIG. 11 has been provided which shows a control diagram representation of the operation of the servo system of FIG. 3 in accordance with preferred embodiments of the present invention. Particularly, the control diagram of FIG. 11 is representative of the programmed operation of the digital signal processor (DSP) of FIG. 3. As several of the operative blocks and interconnecting paths of FIG. 11 are similar to those set forth in FIG. 7, like reference numerals are used therefor. However, it will be noted from an initial review of FIG. 11 that the linearization block 224 of FIG. 7 has been removed from FIG. 11; moreover, FIG. 11 provides several new blocks that were not present in FIG. 7, including a burst signal predictor 300 (also referred to as a position signal, or PS predictor), a $PS1_P$ table 302, a $PS2_P$ table 304, as well as a second PES generator block 305 which is substantially similar to the PES generator block 216.

As will be explained in greater detail below, the diagram of FIG. 11 operates to provide servo control by generating a predicted, nonlinear PES which is adaptively adjusted to match the nonlinearity of the raw PES from the system. The predicted, nonlinear PES provides a more accurate estimate of true head position, allowing improved control characteristics as compared to the prior art.

With particular reference now to FIG. 11, servo signals are provided by the plant 200 to the demodulator 158, which as before generates and outputs PS1 and PS2 signals (such as 208, 210 of FIG. 8) which are combined by the PES generator 216 to generate the raw PES, typified by curve 218 of FIG. 9. Unlike FIG. 7, though, the raw PES on path 226 is combined at summing block 236 with a predicted PES generated as follows.

The predicted position $X_{PRED}$ output by the observer 282 on path 284 is provided to the PS predictor 300, which generates $PS1_P$ and $PS2_P$ signals on paths 306 and 308, respectively, the $PS1_P$ and $PS2_P$ signals adaptively adjusted so as to be nominally identical to the PS1 and PS2 signals output by the demodulator 158. Further adaptation of the $PS1_P$ and $PS2_P$ signals is accomplished by the $PS1_P$ and $PS2_P$ tables 302, 304, after which the predicted PES is generated by the PES generator 308 from the table-adapted $PS1_P$ and $PS2_P$ signals on paths 310, 312. The predicted PES is output on path 314 to the delay block 285, after which the delayed predicted PES is provided to the summing block 236 on path 316.

The manner in which the PS predictor 300 generates the $PS1_P$ and $PS2_P$ signals is set forth by the control diagram representation of FIG. 12. As shown in FIG. 12, the predicted position $X_{PRED}$ is provided as an input to two separate channel paths, one used to generate $PS1_P$ and the second used to generate $PS2_P$. Generation of $PS1_P$ will be discussed first.

$X_{PRED}$ is initially shown as an input to a fraction block 318, which operates to remove the fractional portion of the $X_{PRED}$ for each track. The need for block 318 can be more fully appreciated by FIG. 13, which provides a graphical representation of an $X_{PRED}$ curve 320 plotted against an x-axis 322 indicative of position (tracks) and a y-axis 324 indicative of magnitude. A linear relationship between position and magnitude is set forth by the graph of FIG. 13, as it will be understood that $X_{PRED}$ is a multi-bit value comprising both a Gray code (i.e., track address) component as well as a position (i.e., location within each track) component, as measured from an initial track. Thus, it is necessary to strip out the portion of the $X_{PRED}$ value corresponding to track address, leaving the position component (e.g. using just the least significant bit or bits indicative of position).

Figure 15:
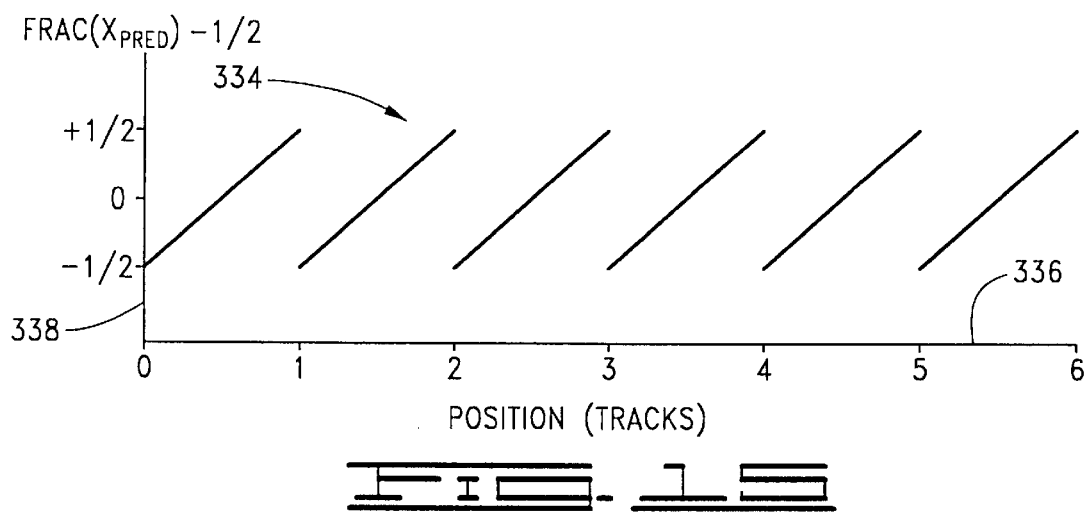
FIG. 15 shows the operation of the subtract one-half (½) block of FIG. 12 to adjust the relative value of the fraction segments from FIG. 14.

The resulting position components (fraction segments) are denoted as $FRAC(X_{PRED})$ and shown at 326 in FIG. 14, plotted against similar x,y axes 328, 330 and ranging from values of zero to one. As the PS1 and PS2 signals (208, 210 of FIG. 8) are normalized about a zero value (i.e., zero PES indicates track center), the diagram of FIG. 12 next passes to a subtract ½ block 332, which shifts the fraction segments of FIG. 14 down one-half track, as shown in FIG. 15. More particularly, FIG. 15 shows a series of shifted fraction segments 334, plotted against corresponding x, y axes 336, 338, and having magnitude values ranging from −½ to +½.

Figure 16:
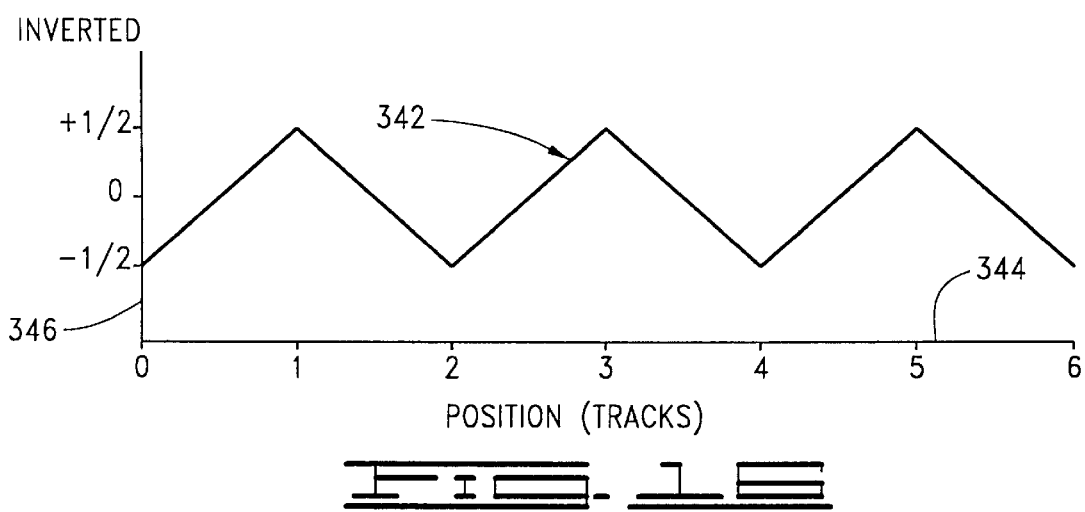
FIG. 16 shows the operation of the invert block of FIG. 12 to invert every other segment of FIG. 15 to generate a nominally triangular waveform response.
Figure 17:
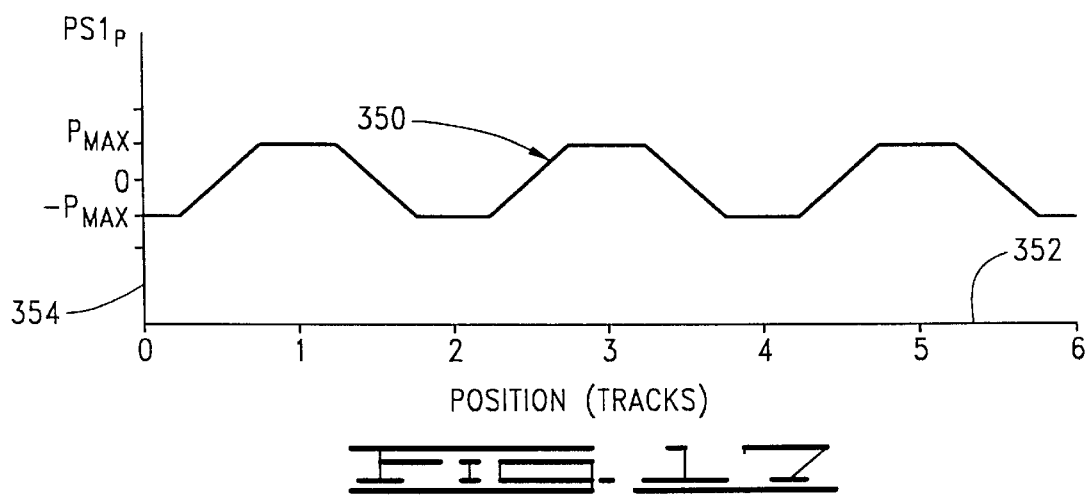
FIG. 17 shows the operation of the apply $P_{MAX}$ block of FIG. 12 to apply a saturation threshold $P_{MAX}$ to the waveform of FIG. 16 to generate the $PS1_P$ signal.

Continuing with FIG. 12, the segments are next selectively inverted by an invert block 340, so that every other segment is inverted to obtain a substantially triangular waveform curve as shown at 342 in FIG. 16, plotted against corresponding x, y axes 344, 346. Once selectively inverted, an apply $P_{MAX}$ block 348 applies a saturation threshold $P_{MAX}$ of selected magnitude to the positive and negative extending portions of the curve 342 to generate the $PS1_P$ signal, as shown at 350 in FIG. 17, plotted against x,y axes 352, 354. It will be recognized that the resulting $PS1_P$ signal 350 is a line segment approximation of the PS1 signal 208 of FIG. 8.

Figure 18:
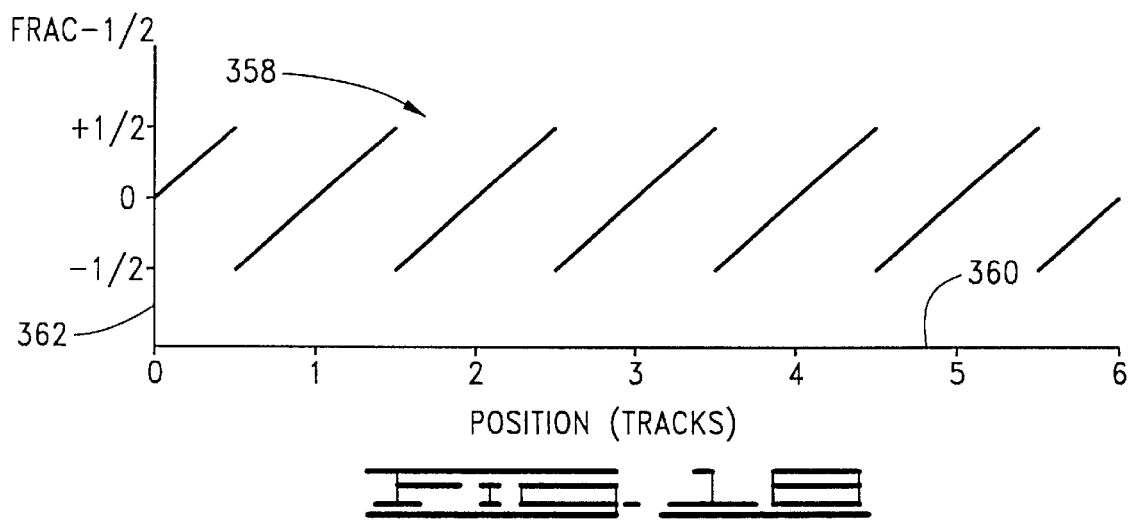
FIG. 18 shows the operation of the shift one-half (½) track and fraction blocks of FIG. 12 to generate a series fraction segments similar to the segments of FIG. 14, except that the segments of FIG. 18 are shifted by ½ track.
Figure 19:
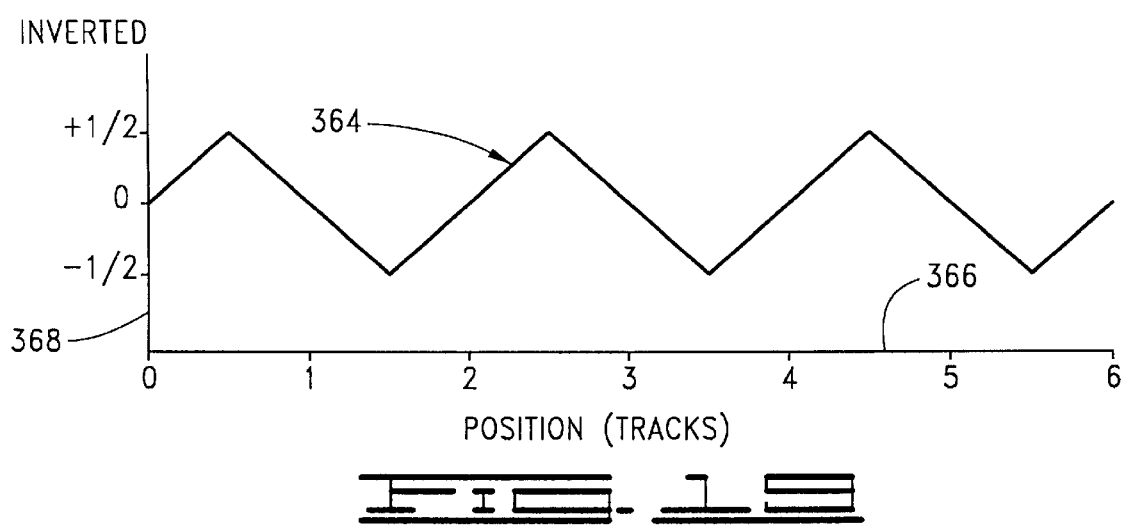
FIG. 19 shows the operation of the invert block of FIG. 12 to generate a nominally triangular waveform response from the segments of FIG. 18.
Figure 20:
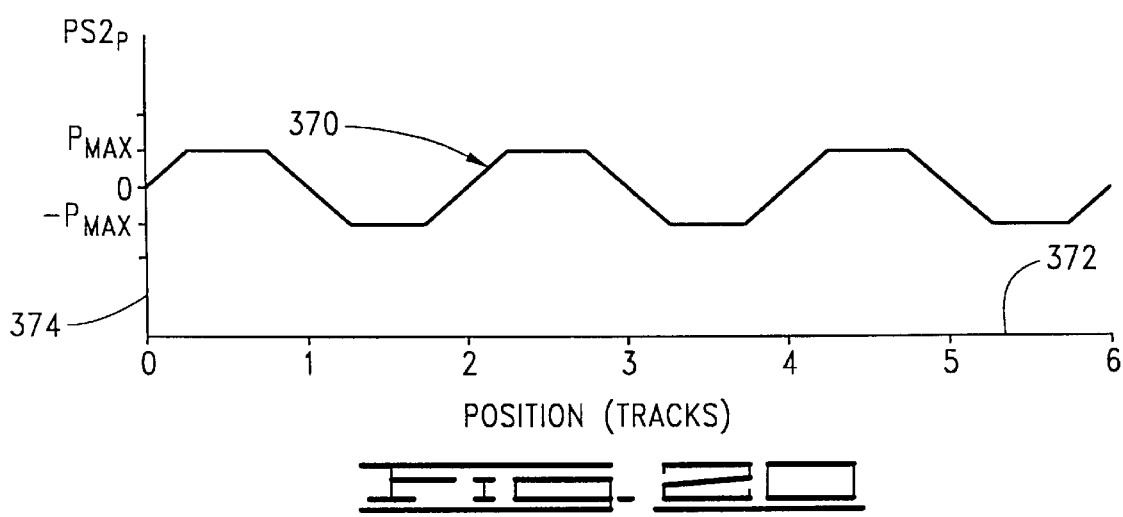
FIG. 20 shows the operation of the apply $P_{MAX}$ block of FIG. 12 to apply the saturation threshold $P_{MAX}$ to the waveform of FIG. 19 to generate the $PS2_P$ signal.

In similar fashion, the $PS2_P$ signal is generated by the $PS2_P$ channel path of the PS predictor 300 of FIG. 12 using second fraction, subtract ½, invert and apply $P_{MAX}$ blocks 318, 332, 340 and 348. However, as the PS2 signal is shifted by ½ track relative to the PS1 signal (see FIG. 8), a shift ½ track block 356 is additionally provided. The PS predictor 300 thus successively generates adjusted fraction segments 358 (FIG. 18, plotted against x,y axes 360, 362), a substantially triangular waveform curve 364 (FIG. 19, plotted against x,y axes 366, 368) and the $PS2_P$ signal at 370 (FIG. 20, plotted against x,y axes 372, 374). As with the $PS1_P$ signal, the $PS2_P$ signal 370 comprises a line segment approximation of the PS2 signal 210 of FIG. 8. It will be noted at this time that the apply $P_{MAX}$ blocks 348 are additionally provided with a capability of applying curve shaping to the $PS1_P$ and $PS2_P$ signals to provide a better prediction of the PS1 and PS2 signals. This additional capability, however, will be discussed in greater detail below.

The $P_{MAX}$ values are unique to each head 120 and are generally correlated to the width of each head. It thus follows that the resulting $P_{MAX}$ values not only facilitate generation of the $PS1_P$ and $PS2_P$ signals, but can also be used in other types of compensation efforts based on the individual widths of the heads (with respect to the tracks). The manner in which the $P_{MAX}$ values are adaptively determined for each head will now be discussed with reference to FIGS. 21 and 22.

Figure 21:
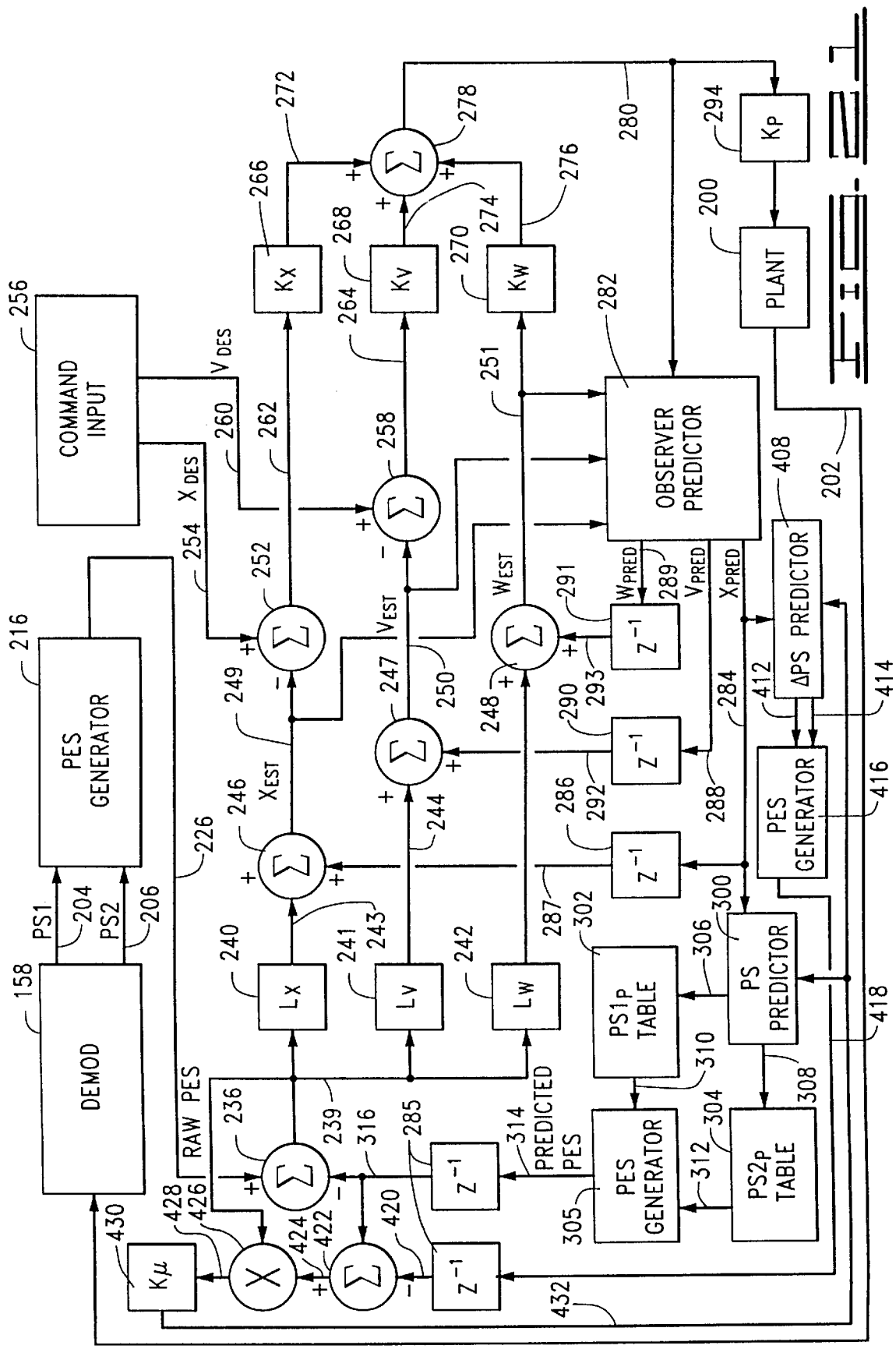
FIG. 21 shows the control diagram representation of FIG. 11 with additional blocks which are used to adaptively set the saturation threshold $P_{MAX}$ used by the PS predictor of FIGS. 11 and 21, in accordance with preferred embodiments of the present invention.

Initially, FIG. 21 shows the control diagram representation of FIG. 11 with additional blocks which are used to adaptively set the saturation thresholds $P_{MAX}$ used by the PS predictor of FIGS. 11, in accordance with preferred embodiments of the present invention. As before, like blocks and paths from previously discussed drawings are identified with the same reference numerals in FIG. 21. Corresponding to FIG. 21 is FIG. 22, which illustrates a flow chart for a PS PREDICTOR ADAPTATION routine 400, representative of the steps performed by the diagram of FIG. 21 in adaptively selecting the value of $P_{MAX}$ for each head 120.

Figure 22:
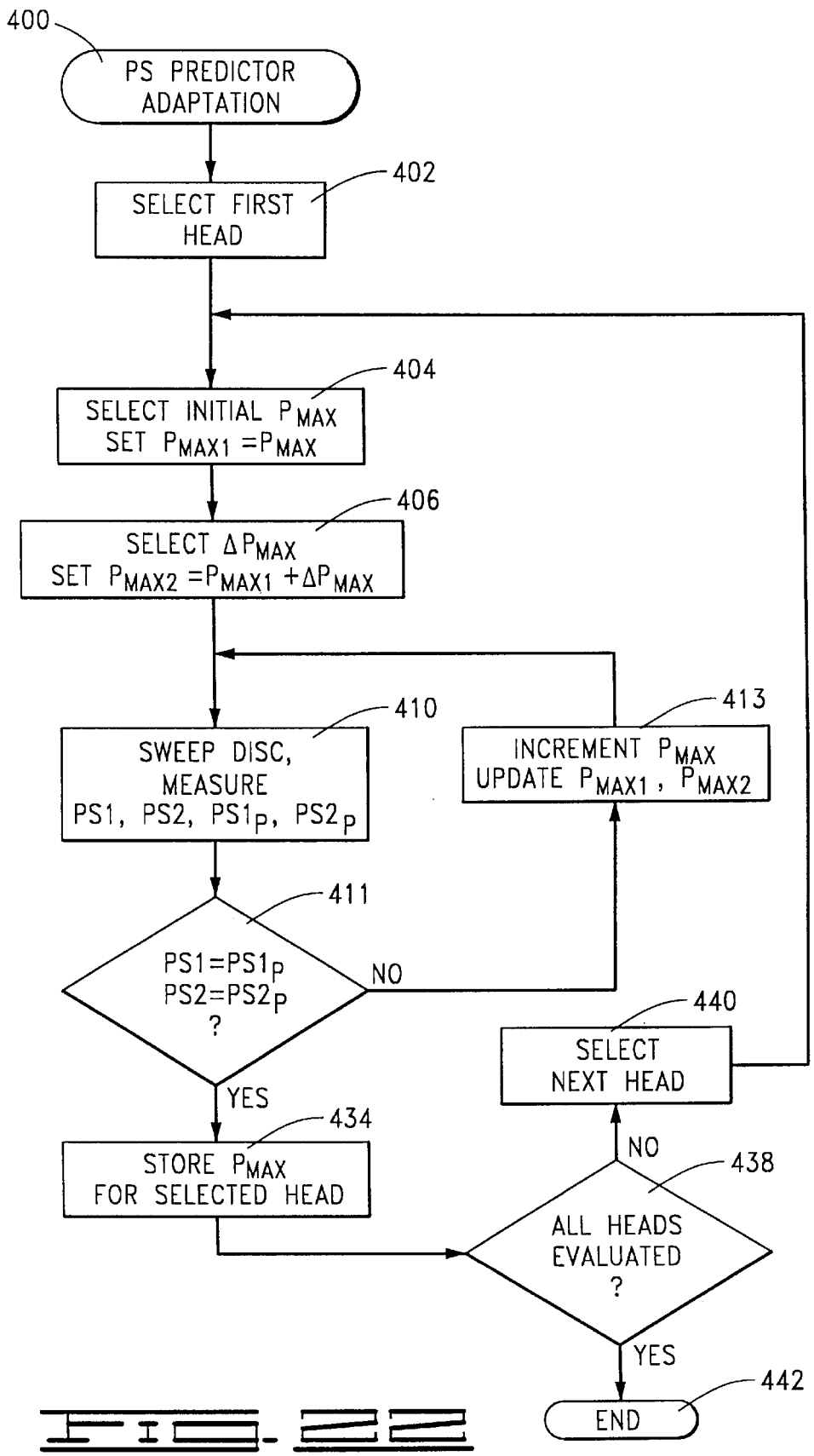
FIG. 22 is a flow chart illustrating the steps of a PS PREDICTOR ADAPTATION routine, indicative of the programming of the DSP of FIG. 3 and setting forth the operation of the control diagram of FIG. 21 in setting the saturation threshold $P_{MAX}$.

As shown at step 402 of FIG. 22, the routine initially proceeds to select the first head for evaluation. It will be recognized that in a dedicated servo system only the servo head or heads will be selected during the operation of the routine 400, but in an embedded servo system (such as the servo circuit 144 of FIG. 3), all of the heads 120 will be selected in turn.

Continuing with FIG. 22, at step 404 an initial value of $P_{MAX}$ is selected. As $P_{MAX}$ will be expressed as a digital value, preferably the smallest non-zero value available from the configuration of the system will be selected. Step 404 further shows that once the initial value of $P_{MAX}$ has been selected, a value $P_{MAX1}$ is set equal to $P_{MAX}$, with $P_{MAX1}$ being the value utilized by the apply $P_{MAX}$ blocks 348 (FIG. 12) of the PS predictor 300 to generate the $PS1_P$ and $PS2_P$ signals on paths 306 and 308.

Next, an increment value $\Delta P_{MAX}$ is selected by step 406, the $\Delta P_{MAX}$ used to generate a $P_{MAX2}$ value in relation to the sum of $\Delta P_{MAX}$ and $P_{MAX1}$ The $P_{MAX2}$ value is used by a $\Delta PS$ predictor 408 of FIG. 21 having the same nominal construction as the PS predictor 300 of FIGS. 11 and 12.

Once $P_{MAX1}$ and $P_{MAX2}$ values have been obtained, the routine of FIG. 22 continues to step 410 where the servo circuit 144 initiates a controlled sweep of the disc 106 at a preferred rate of one-eighth of a track width per servo block 166 (FIG. 4), so that servo position field information from the disc 106 is successively provided to the servo circuit 144 at ⅛ track increments. As the head 120 is swept across the disc 106, step 410 further measures the values of the PS1 and PS2 signals from paths 204 and 206 (FIG. 21) as well as the values of the $PS1_P$ and $PS2_P$ signals output on paths 306 and 308 by the PS predictor 300.

From step 410, the flow of FIG. 22 passes to decision step 411 where the DSP 160 determines whether the measured PS1, PS2 are nominally equal to the predicted $PS1_P$, $PS2_P$ values (within a selected tolerance). If not, the flow passes to step 413 wherein the value of $P_{MAX}$ is incremented and the $P_{MAX1}$ and $P_{MAX2}$ values used by the PS predictor 300 and the $\Delta PS$ predictor 408 are updated.

The manner in which the $P_{MAX}$ value is updated can be understood with reference back to FIG. 21. Initially, it will be noted that the $PS1_P$ and $PS2_P$ signals of paths 306 and 308 are passed through the $PS1_P$ and $PS2_P$ tables 302 and 304; however, because the tables 302 and 304 are optimized during a successive operation to be discussed in detail below, the tables 302 and 304 do not operate to modify the signals at this time (that is, the signals of paths 306, 308 are identical to the signals of paths 310, 312).

Thus, the $PS1_P$ and $PS2_P$ signals from paths 310, 312 are presented to the PES generator 305 (which is nominally identical to the PES generator 216), which outputs a predicted, nonlinear PES on path 314 which is delayed by delay block 285 and summed at the summing block 236 with the raw PES signal of path 226, as described above.

At the same time, the $\Delta PS$ predictor 408 uses the $P_{MAX2}$ value to generate $\Delta PS1_P$ and $\Delta PS2_P$ signals on paths 412, 414 which are provided to a PES generator 416 which is nominally identical to the PES generators 216, 305. The PES generator 416 likewise provides a predicted, nonlinear PES value (based on the $\Delta PS1_P$ and $\Delta PS2_P$ values) which is output on path 418 to delay block 285, after which the value is passed along path 420 to a summing block 422, which sums the two outputs from the PES generators 305, 416 to form a prediction gradient on path 424.

The prediction gradient is multiplied by multiplier 426 with the PES error signal output from the summing block 236 to form a product signal on path 428 which is applied to a gain block 430, having gain $K_\mu$. The gain $K_\mu$ is a convergence factor selected to control convergence of the $P_{MAX}$ adaptation process. From the gain block 430, a $P_{MAX}$ update value is passed back to the PS predictor 300 and the $\Delta PS$ predictor 408 by path 432, the $P_{MAX}$ update value being added to the $P_{MAX}$ value so that both the $P_{MAX1}$ and $P_{MAX2}$ values are updated accordingly.

Thus, the operation of steps 410, 411 and 413 of FIG. 22 are continued until such time that $PS1_P$, $PS2_P$ are sufficiently equal to $PS1$, $PS2$. Thereafter, the flow passes to step 434 wherein the resulting, converged value of $P_{MAX}$ is stored for the selected head 120.

The routine next determines whether all heads (which transmit servo information) have been evaluated at decision step 438. If not, the flow passes to step 440 wherein the next head is selected and the routine returns back to step 404. At such time that all heads have been evaluated, the routine passes from the decision step 438 and ends at step 442.

Figure 23:
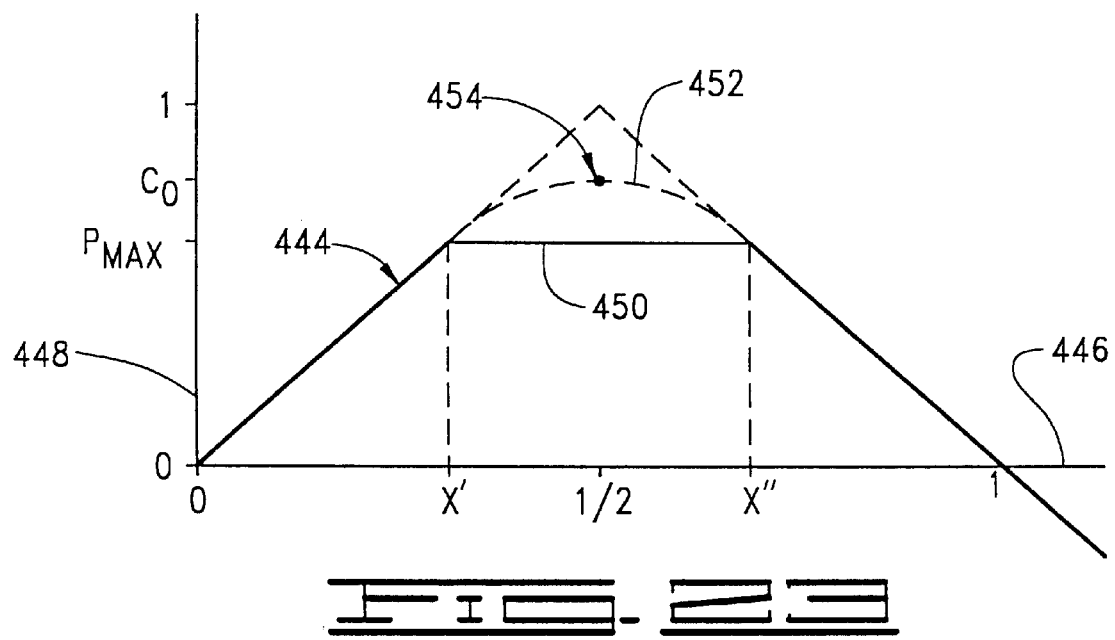
FIG. 23 sets forth a graphical representation of a normalized portion of the $PS1_P$ and $PS2_P$ signals, generally illustrating the manner in which additional second order, quadratic shaping is preferably employed to saturation zones of the $PS1_P$ and $PS2_P$ to obtain better predictions of the PS1 and PS2 signals.

Having concluded the foregoing discussion of the operation of the circuit diagram of FIG. 21 in accordance with the routine of FIG. 22, the operation of the apply $P_{MAX}$ blocks 348 (FIG. 12) to shape the saturation zones of the $PS1_P$ and $PS2_P$ signals will now be discussed. With reference to FIG. 23, shown therein is a graphical representation of a portion of a selected one of the $PS1_E$ and $PS2_E$ signals (denoted at 444). To facilitate the present discussion, the portion 444 has been normalized against an x-axis 446 indicative of position and a y-axis 448 indicative of amplitude. However, it will be readily understood that this generalized representation set forth by FIG. 23 and the following discussion thereof can be readily adjusted so as to apply to each of the saturation zones, both positively and negatively extending, of both the $PS1_P$ and $PS2_P$ signals.

Generally, as discussed above the first pass approximation provided by the $PS1_P$ and $PS2_P$ signals (as shown more fully at 350 in FIG. 17 and 370 in FIG. 20) are formed as substantially straight line segments. However, it will be appreciated that MR heads do not typically provide linear saturation zones (such as designated at 450 in FIG. 23), but rather exhibit curvilinear characteristics. Thus, the apply $P_{MAX}$ blocks 348 further operate to select a curved saturation zone response, such as indicated by curvilinear portion 452. The manner in which the PS predictor 300 operably modifies $PS1_P$ and $PS2_P$ to include this curvilinear response will now be briefly presented.

It will first be appreciated that the curvilinear portion 452 of FIG. 23 can be modeled as a second order, quadratic response. It is desirable that the portion 452 have the same slope at points $(x',P_{MAX})$ and $(x'',P_{MAX})$, so as to prevent discontinuities which can adversely affect servo performance. Moreover, if the apex of the portion 452 (denoted at 454) has coordinates (½, $C_0$), the following functional relationship can be used to describe the portion 452:

$$f(x-\tfrac{1}{2})=C_0+C_2(x-\tfrac{1}{2})^2 \quad (2)$$

where $C_0$ and $C_2$ are constants, determined as follows. Solving for $C_2$, at $x=x'$, $$\frac{\partial}{\partial x}f\left(x'-\frac{1}{2}\right)=2C_2\left(x'-\frac{1}{2}\right) \quad (3)$$

$$2=2C_2\left(\frac{P_{MAX}}{2}-\frac{1}{2}\right) \quad (4)$$

$$C_2=\frac{2}{P_{MAX}-1} \quad (5)$$

To solve for C0, at $x=x'$, $$f(x'-\tfrac{1}{2})=P_{MAX} \quad (6)$$

$$C_0+C_2(x'-\tfrac{1}{2})^2=P_{MAX} \quad (7)$$

$$C_0+\left(\frac{2}{P_{MAX}-1}\right)\left(\frac{P_{MAX}}{2}-\frac{1}{2}\right)^2=P_{MAX} \quad (8)$$

$$C_0+\tfrac{1}{2}(P_{MAX}-1)=P_{MAX} \quad (9)$$

$$C_0=\tfrac{1}{2}(P_{MAX}+1) \quad (10)$$

Accordingly, the PS predictor 300 of FIGS. 11, 21 applies the quadratic shaping to the saturation zones of the $PS1_P$ and $PS2_P$ signals based upon the foregoing derivations, adjusting the values in relation to the relative locations of the saturation zones about the position axes (such as 352, FIG. 17 and 372, FIG. 20). The $PS1_P$ and $PS2_P$ signals can thus be described as follows:

If $|input|<P_{MAX}$, output=input

If $|input|\geq P_{MAX}$, output=f(x-½)  (11)

where "|input|" is the absolute value of the signals provided to the apply $P_{MAX}$ blocks 348 of FIG. 12, "output" is the the output of the apply $P_{MAX}$ blocks 348 ($PS1_P$ or $PS2_P$ on paths 306, 308), and "f(x-½)" describes the quadratic shaping discussed above. Hence, the apply $P_{MAX}$ blocks 348 generally operate in accordance with the conditions of equation (11) to output the $PS1_P$ and $PS2_P$ signals.

Although the second order model of the PS1 and PS2 signals as presented above provides a sufficiently close approximation model to facilitate stable servo operation, it will be recognized that higher order effects relating to the construction and operation of MR heads will still exist which provide small discrepancies between the actual position signals PS1, PS2 and the predicted position signals $PS1_P$, $PS2_P$. Such effects are shown in FIG. 24, which shows a portion of a selected predicted signal 456 in relation to a corresponding position signal 458.

Figure 24:
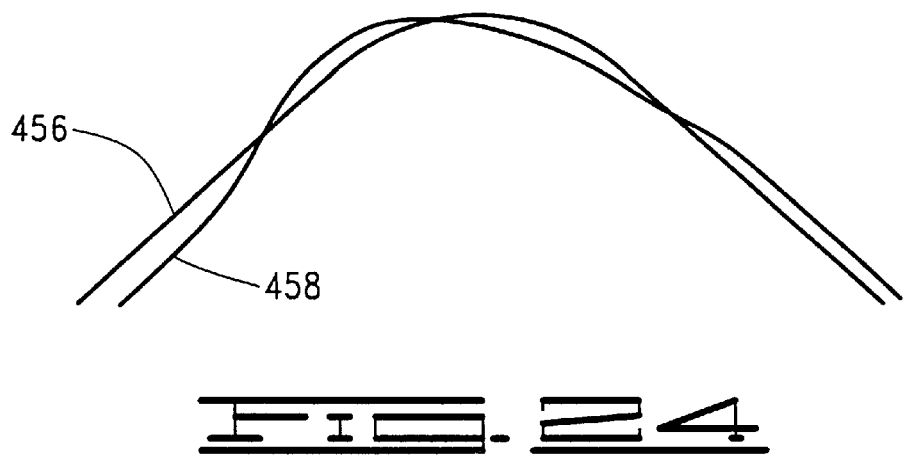
FIG. 24 illustrates MR head asymmetries that can be further adaptively compensated through the use of the PS1 and PS2 tables of FIG. 11, in order to gain still better estimates of the PS1 and PS2 signals.

As shown in FIG. 24, effects relating to the typical asymmetric response of an MR head (shown by signal 458) are not necessarily accounted for by the prediction model detailed above. As a result, the aforementioned PS1 and PS2 tables 302, 304 (FIGS. 11, 21) can be advantageously employed to account for these asymmetric effects.

FIG. 25 provides a flow chart for a TABLE ADAPTATION routine 460, representative of the programming of the DSP of FIG. 3 in setting appropriate values for the PS1 and PS2 tables 302, 304 of FIGS. 11, 21 to address the MR head asymmetries set forth by FIG. 24.

As shown in FIG. 25, the first head is initially selected at step 462, after which the selected head is swept across the corresponding disc in ⅛ track increments at block 464 and successive measurements are taken of PS1, PS2, PS1$_P$ and PS2$_P$. It will be recognized that the operation of step 464 is substantially similar to the operation of step 410 of FIG. 22.

Next, table sets T$_1$, T$_2$ are calculated at step 466 in accordance with the following relationships:

$$T_1 = PS1 - PS1_P \quad (12)$$

$$T_2 = PS2 - PS2_P \quad (13)$$

and provided to the tables 302, 304 (FIGS. 11, 21) as shown by step 468. Generally, the T$_1$ and T$_2$ sets provide an indication of error between the actual PS1, PS2 signals and the corresponding predicted PS1$_P$, PS2$_P$ signals, at ⅛ track increments. Because the routine of FIG. 25 operates to converge these table sets to final values, decision step 470 next determines whether convergence range values ΔT$_1$, ΔT$_2$ are sufficiently equal to zero, with ΔT$_1$, and ΔT$_2$ being the difference between the two most recently determined values of T$_1$, T$_2$ respectively (i.e., ΔT$_1$, ΔT$_2$ are indicative of the changes in the table values over the most recent sampling interval).

Accordingly, the routine of FIG. 25 cycles through steps 464, 466, 468 and 470 until such time that the table sets T$_1$, T$_2$ for the selected head have substantially settled to final values. The routine then continues to decision step 472 which determines whether all applicable heads have been evaluated; if not, step 474 selects the next head and the process is repeated. When all heads have been evaluated so that the PS1$_P$, PS2$_P$ tables 302, 304 include finally converged table sets T$_1$, T$_2$, for each of the heads, the routine ends at 476.

During subsequent operation, the actual PS1$_P$, PS2$_P$ signal outputs presented to the PS1$_P$, PS2$_P$ tables 302, 304 are thereafter modified in accordance with the T$_1$, T$_2$ sets using linear interpolation techniques. The set values are preferably determined at a sweep rate of eight position samples per track, but it will be understood that the set values can be determined at a different rate, depending upon various considerations including processing overhead and table size (storage) capabilities.

It will now be understood that the present invention (as embodied above) provides several important advantages over the prior art. In dealing with problems introduced by nonlinear characteristics of MR heads, the prior art typically attempts to linearize the raw PES obtained from the heads and to use the linearized PES in servo control operations. Hence, achievable servo performance and track density levels depend in large part on the ability of this prior art linearization function to present a substantially linear PES, in view of a variety of factors such as MR head size variations and asymmetric output characteristics and system repeatable runout (RRO) and nonrepeatable runout (NRRO) effects.

By contrast, the present invention refrains from attempts to linearize the PES, and instead formulates a very accurate model of the nonlinear raw PES which is then used during servo control. Thus, deficiencies associated with PES linearization do not serve as an upper limit on achievable servo performance and track density levels, as there is no need to linearize the PES. Moreover, the nonlinear PES prediction of the present invention facilitates the application of modern adaptive control methods.

Another important advantage of the present invention is the potentially wider range of head width variations that can be accommodated as compared to the prior art. This can have a significant economic benefit, as heads are usually among the most expensive components in a disc drive, next to the media (discs). That is, the use of the present invention can result in relaxation of head width tolerances and improvements in manufacturing yields, which will generally tend to reduce manufacturing costs.

Yet another important advantage is that the present invention provides real-time (on-the-fly) compensation for changes in head characteristics during operation, such as typically induced by changes in operational temperature.

As discussed above, it has been found that the P$_{MAX}$ saturation thresholds will typically provide a direct correlation to read element head width; accordingly, the present invention can be readily utilized as a process quality indicator, facilitating valuable feedback to a supplier of the heads to improve head manufacturing process control. As will be recognized, it can be difficult for a disc drive manufacturer to assess variations in effective read element head width for a population of heads without consuming relatively significant resources.

In summary, it will be clear that the present invention is directed to an apparatus and method for optimizing servo performance of a disc drive (such as 100).

A head (such as 120) is disposed adjacent a rotatable disc (such as 106) on which a plurality of tracks (such as 164) are defined by servo information (such as 166). A servo circuit (such as 144) controllably positions the head adjacent the tracks by generating an actual position error signal (such as 218 in FIG. 9, as provided on path 226 in FIG. 11) nominally characterized as nonlinear over a portion of the width of a selected track and indicative of position of the head relative to the selected track from servo burst patterns (such as 178, 180, 182, 184). The servo circuit further generates a predicted position error signal (such as on paths 314, 316) as an approximation of the actual position error signal from an estimated position of the head (such as X$_{PRED}$ on path 284), and compares the actual position error signal and the predicted position error signal.

The servo circuit can further comprise a demodulator (such as 158) which generates burst signals (such as 208, 210 of FIG. 8) in response to readback signals from the head as the head reads the servo burst patterns of the selected track, an actual position error signal generator (such as 216) which generates the actual position error signal as a selected combination of the burst signals, a summing block (such as 236) which compares the actual position error signal with the predicted position error signal to generate a position error signal error, an estimation and prediction circuit (such as 240, 241, 242, 246, 247, 248, 282) which generates the predicted position of the head in response to the position error signal error, a burst signal predictor (such as 300) which generates predicted burst signals (such as 350, 370, 444, 456) as approximations of the burst signals generated by the demodulator, and a predicted position error signal generator (such as 305) which generates the predicted position error signal in response to the predicted burst signals.

A table (such as 302, 304) can be additionally provided to store a set of error values in relation to a difference between the burst signals used to generate the actual position error signal and the predicted burst signals generated by the burst signal generator, the table operating to modify the predicted burst signals generated by the burst signal generator are using the error values to provide an improved approximation of the burst signals from the demodulator, and wherein the predicted position error signal generator generates the predicted position error signal using the predicted burst signals as modified by the table.

For purposes of the appended claims, consistently with the foregoing discussion the term "signal" will be understood to include both analog and digital expressions. The term "circuit" will be understood to include both hardware and software/firmware type implementations. The phrase "position error signal" will be understood to describe a signal indicative of the relative position of a head with respect to a selected radial point of a selected track (such as the center of the track) and will have a selected range, with a first range value generally corresponding to one boundary of the selected track, a second range value generally corresponding to the remaining boundary of the selected track and a mid-range value between the first and second range values generally corresponding to the center of the track.

The phrase "burst signals" will be understood as deriving from one or more burst patterns (such as 178, 180, 182, 184) and being generally cyclical in nature in relation to the alignment of the burst pattern or patterns with the selected track. For example, but not by limitation, the PS1 burst signal generally cycles from a zero value at track center between the A and B burst patterns 178, 180 and reaches oppositely extending maximum values at the centers of the A and B burst patterns. It will be further understood that although a null servo pattern has been shown for purposes of disclosure, other types of servo patterns can be readily used in accordance with the claimed invention.

The phrase "programmable processing device" will be understood to describe any number of types of programmable processors which carry out instructions in associated programming, such as the DSP 160. The terms "sum," "summing" and the like will be understood to include operations whereby magnitudes of values are added or subtracted. The terms "waveforms," "curves," and the like will be understood to include digitally expressed values. Finally, although certain method claims below are provided with steps in a particular order, it will be readily understood that the claimed invention is not necessarily limited to the order of the steps presented, unless otherwise particularly indicated by the language of the claims.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for controlling position of a head relative to a rotatable disc of a disc drive, comprising steps of:
   (a) obtaining an actual position error signal generally indicative of relative position of the head with respect to a track on the disc from servo information associated with the track, the servo information including a plurality of servo patterns from which actual servo burst signals are obtained;
   (b) generating a predicted position error signal as an approximation of the actual position error signal using a nonlinear model so that nonlinear characteristics of the actual position error signal are reflected in the predicted position error signal, comprising steps of:
   (b1) generating first and second waveforms from an estimated position of the head;
   (b2) applying a saturation threshold of selected magnitude to the first and second waveforms to form at least first and second predicted burst signals, each characterized as a series of nominally linear line segments; and
   (b3) combining the first and second predicted servo burst signals to generate the predicted position error signal; and
   (c) controlling the position of the head in relation to a combination of the actual position error signal and the predicted position error signal.

2. The method of claim 1, wherein the actual position error signal of step (a) is obtained in relation to a selected combination of burst signals generated as the head passes proximate the servo information.

3. The method of claim 1, wherein the application of the saturation threshold of step (b2) defines a series of saturation zones within the first and second predicted burst signals, and wherein the generation of the predicted position error signal of step (b) further comprises a step of:
   (b4) modifying the predicted burst signals through curvilinear shaping of the series of saturation zones to generate modified predicted burst signals, so that the combination of the first and second predicted burst signals of step (b3) uses the modified predicted burst signals.

4. The method of claim 1, wherein the generation of the first and second waveforms of step (b1) is performed as the head is controllably advanced across the width of the track.

5. The method of claim 1, wherein the generation of the predicted position error signal of step (b) further comprises steps of:
   (b4) providing a table of error values in relation to a difference between the burst signals of step (a) and the predicted burst signals of step (b2); and
   (b5) modifying the predicted burst signals through application of the table of error values to generate table-modified predicted burst signals, so that the combination of the first and second predicted burst signals of step (b3) uses the table-modified predicted burst signals.

6. The method of claim 5, wherein the table of values of step (b4) is generated as the head is controllably advanced across the width of the track.

7. The method of claim 1, wherein the disc drive uses the saturation threshold as an indication of the width of a read element the head with respect to the width of the track.

8. A disc drive, comprising:
   a head adjacent a rotatable disc on which a plurality of tracks are defined; and
   a servo circuit which controllably positions the head adjacent the tracks by generating an actual position error signal indicative of position of the head relative to a selected track from actual servo burst signals obtained from servo burst patterns of the selected track, generating a predicted position error signal as an approximation of the actual position error signal from a combination of predicted burst signals formed as approximations of the actual servo burst signals so that nonlinear characteristics of the actual position error signal are present in the predicted position error signal, and comparing the actual position error signal and the predicted position error signal, wherein the servo circuit comprises:
   a demodulator which generates burst signals in response to readback signals from the head as the head reads the servo burst patterns of the selected track;
   an actual position error signal generator, operably coupled to the demodulator, which generates the actual position error signal as a selected combination of the burst signals;

a summing block, operably coupled to the actual position error signal generator, which sums the actual position error signal with the predicted position error signal to generate a position error signal error;

an estimation and prediction circuit, operably coupled to the summing block, which generates the estimated position of the head in response to the position error signal error;

a burst signal predictor, operably coupled to the estimation and prediction circuit, which generates predicted burst signals as approximations of the burst signals generated by the demodulator; and a predicted position error signal generator, operably coupled to the burst signal predictor and the summing block, which generates the predicted position error signal in response to the predicted burst signals.

9. The disc drive of claim 1, wherein the burst signal predictor generates the predicted burst signals as a series of nominally linear line segments from the estimated position of the head from the estimation and prediction circuit.

10. The disc drive of claim 9, wherein the burst signal predictor generates the series of nominally linear line segments by forming a series of substantially triangular waveforms and applying a saturation threshold at positively and negatively extending portions of the triangular waveforms to form saturation zones.

11. The disc drive of claim 10, wherein the burst signal predictor further generates the predicted burst signals by curvilinearly shaping the saturation zones.

12. The disc drive of claim 10, wherein the servo circuit further comprises:

a table, operably coupled to and functionally disposed between the burst signal predictor and the predicted position error signal generator, which provides a set of error values in relation to a difference between the burst signals used to generate the actual position error signal and the predicted burst signals generated by the burst signal generator, wherein the table operates to modify the predicted burst signals generated by the burst signal generator are using the error values to provide an improved approximation of the burst signals from the demodulator, and wherein the predicted position error signal generator generates the predicted position error signal using the predicted burst signals as modified by the table.

* * * * *

UNITED STATES PATENT AND TRADEMARK OFFICE
CERTIFICATE OF CORRECTION

PATENT NO. : 6,091,567
DATED : July 18, 2000
INVENTOR(S) : Evert Steen Cooper and Randall David Hampshire It is certified that error appears in the above-identified patent and that said Letters Patent is hereby corrected as shown below:

Column 13,
Line 3, replace "to delay block 285" with -- to delay block 286 --.

Column 19,
Line 17, replace "Claim 1" with -- Claim 8 --.

Signed and Sealed this

Tenth Day of September, 2002

Attest:

Attesting Officer

JAMES E. ROGAN
Director of the United States Patent and Trademark Office